US006649860B2

(12) United States Patent
Kawachi et al.

(10) Patent No.: US 6,649,860 B2
(45) Date of Patent: Nov. 18, 2003

(54) TRANSFER TYPE PLASMA HEATING ANODE

(75) Inventors: Takeshi Kawachi, Futtsu (JP); Kazuto Yamamura, Futtsu (JP); Hiroyuki Mitake, Futtsu (JP); Junichi Kinoshita, Kimitsu (JP); Katsuhiro Imanaga, Kimitsu (JP); Masahiro Doki, Kimitsu (JP); Yoshiaki Kimura, Kimitsu (JP); Teruo Kawabata, Muroran (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/913,342

(22) PCT Filed: Dec. 13, 2000

(86) PCT No.: PCT/JP00/08828

§ 371 (c)(1),
(2), (4) Date: Aug. 10, 2001

(87) PCT Pub. No.: WO01/43511

PCT Pub. Date: Jun. 14, 2001

(65) Prior Publication Data

US 2002/0134766 A1 Sep. 26, 2002

(30) Foreign Application Priority Data

Dec. 13, 1999 (JP) .......................................... 11-353772
Dec. 13, 1999 (JP) .......................................... 11-353773

(51) Int. Cl.[7] ................................................ B23K 10/00

(52) U.S. Cl. ............................ 219/121.36; 219/121.52; 219/75; 219/119

(58) Field of Search ....................... 219/121.48, 121.36, 219/121.37, 121.52, 119, 121.38; 313/231.31, 231.41

(56) References Cited

U.S. PATENT DOCUMENTS 5,601,734 A * 2/1997 Luo et al. .............. 219/121.52
5,726,414 A * 3/1998 Kitahashi et al. ...... 219/121.48
5,963,579 A * 10/1999 Henryon ...................... 373/18
6,133,542 A * 10/2000 Dvorak et al. ......... 219/121.47

FOREIGN PATENT DOCUMENTS

JP 2-6073 1/1990
JP 3-205796 9/1991
JP 4-131694 5/1992
JP 4-139384 5/1992
JP 4-190597 7/1992

OTHER PUBLICATIONS

Zenkevich, et al., *J. Nuclear Energy*, Part B, 1–2, 137, 1959,

* cited by examiner

*Primary Examiner*—Mark Paschall
(74) *Attorney, Agent, or Firm*—Kenyon & Kenyon

(57) ABSTRACT

A transferred plasma heating anode for heating a molten metal in a container by applying Ar plasma generated by passing a direct current through the molten metal, the transferred plasma heating anode comprising; an anode, composed of a conductive metal, that has an internal cooling structure, a metal protector having an internal cooling structure that is placed outside the anode with a constant gap between the anode and the protector, and a gas supply means that supplies an Ar-containing gas to the gap, is characterized by the central portion on the external surface of the anode tip end being inwardly recessed.

25 Claims, 22 Drawing Sheets

TRANSFER TYPE PLASMA HEATING ANODE

TECHNICAL FIELD

The present invention relates to an improvement in a transferred plasma heating anode and, particularly, to a transferred plasma heating anode suitable for heating a molten steel in a tundish.

BACKGROUND ART

FIG. 1 shows a direct current twin-torch plasma heating device used for heating a molten steel in a tundish. Two plasma torches, an anode 3 and a cathode 4, are inserted through a tundish cover 2, and a plasma arc 6 is generated between the torches 3, 4 and a molten steel 5 to heat the molten steel. An electric current 7 flows from the cathode 4 to the anode 3 through the molten steel 5.

One example of an anode plasma torch is shown in FIG. 2. FIG. 2 shows a cross section of the tip end portion of the anode torch. For example, oxygen-free copper is used as a material for the anode 3. The anode torch comprises an outer cylinder nozzle 8 that is made of a stainless steel or copper and that covers the outside and the anode 3 that is made of copper and that is situated inside the torch. The tip end portion of the anode 3 is in a flat disc-like shape. Both the anode 3 and the outer cylinder nozzle 8 each have a cooling structure. The inlet side and outlet side water paths of cooling water of the anode 3 are partitioned with a partition 9; the inlet side and outlet side water paths of cooling water of the outer cylinder nozzle 8 are partitioned with a partition 11 (reference numerals 10, 12 in FIG. 2 indicating the flows of cooling water). There is a gap 13 between the outer cylinder nozzle 8 and the anode 3, and a plasma gas is blown from the gap 13.

One of the problems associated with the direct current anode plasma torch is that its life is short because the anode tip end is damaged. Because the anode becomes a receiver of electrons during plasma heating operation, electrons strike the external surface of the anode tip end, and the thermal load applied to the tip end external surface becomes significant.

Moreover, the thermal load applied to the anode tip end is as large as several tens of megawatts/$m^2$, and the form of heat transfer on the cooling side at the anode tip end is thought to be a heat transfer through forced-convection nucleate boiling. When the heat transfer is through forced-convection nucleate boiling, the heat transfer rate is a magnitude of $10^5$[W/$m^2$K], and is about 10 times as large as that of a forced-convection heat transfer. When the thermal load applied to the external surface of the anode tip end becomes excessive, the temperature of the heat transfer surface on the cooling side rises, and a burnout phenomenon in which the heat transfer form changes from nucleate boiling to film boiling takes place. When the change takes place, the heat transfer rate rapidly lowers on the heat transfer surface, and the heat transfer surface temperature rises. Finally, the temperature of the anode tip end exceeds the melting point, and there is a possibility that the anode tip end is melted and lost.

For the conventional anode cooling water path structure shown in FIG. 2, a thermal load that causes burnout, namely, a burnout critical heat flux is shown in FIG. 31. In the graph shown in FIG. 31, a radius on the tip end cooling side of the anode 3 in which the maximum radius Rcool on the tip end cooling side thereof is 22 mm is taken as abscissa, and a burnout critical heat flux is taken as ordinate. Zenkevich's formula (Zenkevich et al, J. Nuclear Energy, Part B, 1–2, 137, 1959) is used for estimating the burnout critical heat flux, and the burnout critical heat flux $W_{BO}$ [W/$m^2$] is expressed by the formula (1):

$$W_{BO}=L\sqrt{(\sigma G/\sigma)}(2.5+184(i-i_{cool})/L)\times 10^{-5} \quad (1)$$

wherein L, $\sigma$, G, $\nu$, i and $i_{cool}$ in the formula (1) are physical quantities, L is a heat of vaporization [J/kg], $\sigma$ is a surface tension [N/m], G is a weight speed [kg/$m^2$s], $\nu$ is a kinematic viscosity [$m^2$/s], i is an enthalpy [J/kg] and $i_{cool}$ is an enthalpy [J/kg] of a main stream. It is seen from the graph in FIG. 31 that the burnout critical heat flux near the center is low. The heat flux is low because the influence of the flow rate of the cooling water flowing in the anode 3 is significant. The cooling water flowing from the upper side of the anode in the central portion strikes the anode tip end to lower the flow speed. As a result, the burnout critical heat flux is also lowered. When the thermal load applied to the external surface of the anode tip end exceeds the burnout critical heat flux, it is estimated that burnout takes place on the cooling side of the anode tip end to raise the heat transfer surface temperature and to melt the anode tip end. The central portion of the anode tip end where the burnout critical heat flux is low therefore tends to be melted and lost.

Moreover, when transferred plasma heating is conducted, heat tends to concentrate on the central portion of the external surface of the anode tip end. Furthermore, when a current concentration site (anode spot) is once formed on the anode surface, current further tends to concentrate on the anode spot. That is, when damage begins to be formed on the external surface of the anode tip end due to melting, formation of the damage is further promoted, and the damage finally reaches the cooling water side to end the life of the anode.

FIG. 3 illustrates the pinch effect associated with plasma. A flow 14 of a gas having temperature sufficiently lower than that of plasma 15 blown from a gap 13 between an outer cylinder nozzle 8 and an anode 3 concentrates the plasma 15 in the central direction (thermal pinch effect). In general, the current density in plasma is described as an increasing function of temperature, and the current density in a plasma central portion 16 is large in comparison with the average. As a result, the current density incident on a central portion 17 of the external surface of the anode tip increases. Accordingly, the degree of damage is large in the central portion 17 on the external surface of the anode tip end in comparison with a peripheral portion 18 of the external surface at the tip end. Moreover, electrons 21 moving toward the anode in the plasma receive a force 22 directing toward the central portion by interaction with a rotating magnetic field 20 produced by a current 19 flowing in the plasma (magnetic pinch effect).

Furthermore, as shown in FIG. 4, the anode tip end is outwardly deformed in a protruded shape by the pressure of the cooling water flowing inside, thermal stress and creep. The protruded deformation forms a projection 23 in the central portion 17 of the external surface of the anode tip end. As a result, an electric field 32 is concentrated on the projection 23. Since electrons 21 moving in the plasma are accelerated in the direction of the electric field 32, the current 19 is concentrated on the projection 23. Accordingly, the electric current is further concentrated on the central portion 17 of the external surface at the anode tip end. That is, the central portion 17 of the external surface at the anode tip end is further likely to be damaged. When the damage is increased in the central portion 17 of the external surface at the anode tip end, a cooling water path 25 of the anode is finally broken, and operation becomes impossible. As explained above, as a result of concentrating an electric current on the central portion 17 of the external surface at the anode tip end, the life of the anode is significantly shortened.

FIGS. 5(*a*) to 5(*d*) illustrate the concentration of an electric current on an anode spot. In an initial state (FIG. 5(*a*)) in which the cleanness of an external surface 26 of the anode tip end is excellent, electrons 21 are approximately vertically incident on the external surface 26. However, as explained above (see FIG. 4), an electric current tends to concentrate on the central portion 17 of the external surface at the anode tip end. When the external surface 26 is heated to a high temperature, the copper is melted and evaporated to form a vapor cloud 27 of a copper vapor near the center of the external surface (FIG. 5(*b*)).

When electrons strike the vapor cloud 27, the electrons in the evaporated copper atoms 28 are excited and ionized. Electrons 29 ionized from the copper atoms each have a small mass, and show a large mobility, therefore, the electrons are incident on the external surface of the anode tip end. However, since copper ions 30 show a small mobility and stay in the vapor cloud 27, the vapor cloud 27 is positively charged (FIG. 5(*c*)).

The positive charge potential of the vapor cloud 27 accelerates the electrons 21 in the plasma arc toward the vapor cloud 27 (FIG. 5(*d*)).

Consequently, when an anode spot 31 is formed, electrons in the plasma arc near the external surface 26 of the anode tip end are acceleratedly centered on the central portion of the external surface at the anode tip end. Damage at the anode tip end is acceleratedly increased by such a mechanism.

DISCLOSURE OF INVENTION

The present invention relates to the shape and material of the anode tip end in a plasma heating anode that allows a burnout critical heat flux to be influenced by cooling, and that delays damage to the anode tip end to extend the life of the anode.

In order to solve the above problems, the present inventors provide the present invention, aspects of which are described below.

(1) A transferred plasma heating anode for heating a molten metal in a container by applying an Ar plasma generated by passing a direct current through the molten metal, the transfer mode of plasma heating anode comprising; an anode composed of a conductive metal that has an internal cooling structure, a metal protector having an internal cooling structure that is placed outside the anode with a constant gap between the anode and the protector, and a gas supply means that supplies an Ar-containing gas to the gap, is characterized by the central portion on the external surface of the anode tip end being inwardly recessed.

(2) A transferred plasma heating anode for heating a molten metal in a container by applying an Ar plasma generated by passing a direct current through the molten metal, the transferred plasma heating anode comprising; an anode composed of a conductive metal that has an internal cooling structure, a metal protector having an internal cooling structure that is placed outside the anode with a constant gap between the anode and the protector, and a gas supply means that supplies an Ar-containing gas to the gap, is characterized by the whole of the external surface of the anode tip end being inwardly recessed.

(3) A transferred plasma heating anode for heating a molten metal in a container by applying an Ar plasma generated by passing a direct current through the molten metal, the transfer mode of plasma heating anode comprising; an anode composed of a conductive metal that has an internal cooling structure, a metal protector having an internal cooling structure that is placed outside the anode with a constant gap between the anode and the protector, and a gas supply means that supplies an Ar-containing gas to the gap, is characterized by the cooling surface of the anode tip end having ribs.

(4) A transferred plasma heating anode for heating a molten metal in a container by applying an Ar plasma generated by passing a direct current through the molten metal, the transfer mode of plasma heating anode comprising; an anode composed of a conductive metal that has an internal cooling structure, a metal protector having an internal cooling structure that is placed outside the anode with a constant gap between the anode and the protector, a first gas supply means that supplies an Ar-containing gas to the gap, and a second gas supply means in the interior of the anode, is characterized by the second gas supply means having a function of blowing a gas from the external surface of the anode tip end.

(5) The transferred plasma heating anode according to (1), wherein the central portion and the whole of the external surface of the anode tip end are inwardly recessed.

(6) A transferred plasma heating anode for heating a molten metal in a container by applying an Ar plasma generated by passing a direct current through the molten metal, the transferred plasma heating anode comprising; an anode composed of a conductive metal that has an internal cooling structure, a metal protector having an internal cooling structure that is placed outside the anode with a constant gap between the anode and the protector, and a gas supply means that supplies an Ar-containing gas to the gap, is characterized by the center on the cooling side of the anode tip having a projection.

(7) The transferred plasma heating anode according to (6), wherein the central portion of the external surface of the anode tip end is inwardly recessed.

(8) The transferred plasma heating anode according to (6) or (7), wherein the whole of the external surface of the anode tip end is inwardly recessed.

(9) The transferred plasma heating anode according to any one of (1), (2), (5) and (6) to (8), wherein the cooling side of the anode tip end has ribs.

(10) The transferred plasma heating anode according to any one of (1) to (3), (5) and (6) to (9), wherein the anode has a second gas supply means in the interior of the anode, and the second gas supply means has a function of blowing a gas from the external surface of the anode tip end.

(11) The transferred plasma heating anode according to any one of (1) to (10), wherein the entire and/or central portion of the external surface of the anode tip end is recessed, and the anode has in the interior of the anode one or at least two permanent magnets freely rotatable in the circumferential direction.

(12) The transferred plasma heating anode according to any one of (1) to (11), wherein the material of at least the anode tip end is a copper alloy containing Cr or Zr.

BEST MODE FOR CARRYING OUT THE INVENTION

As explained above, the following cause damage in the central portion of the anode tip: (a) generation of burnout on the heat transfer surface on the cooling side of the anode tip end; (b) current concentration by a pinch effect associated with plasma; and/or (c) protruded deformation and formation of an anode spot at the anode tip end that accelerate current concentration. In the present invention, in order to prevent the generation of burnout, current concentration and/or protruded deformation and formation of an anode spot, the following countermeasures are taken: (A) the shape of the anode tip end is altered; (B) a high strength alloy is used for the anode tip end; and/or (C) a disturbance generator for preventing the formation of an anode spot is installed.

Figure 6:
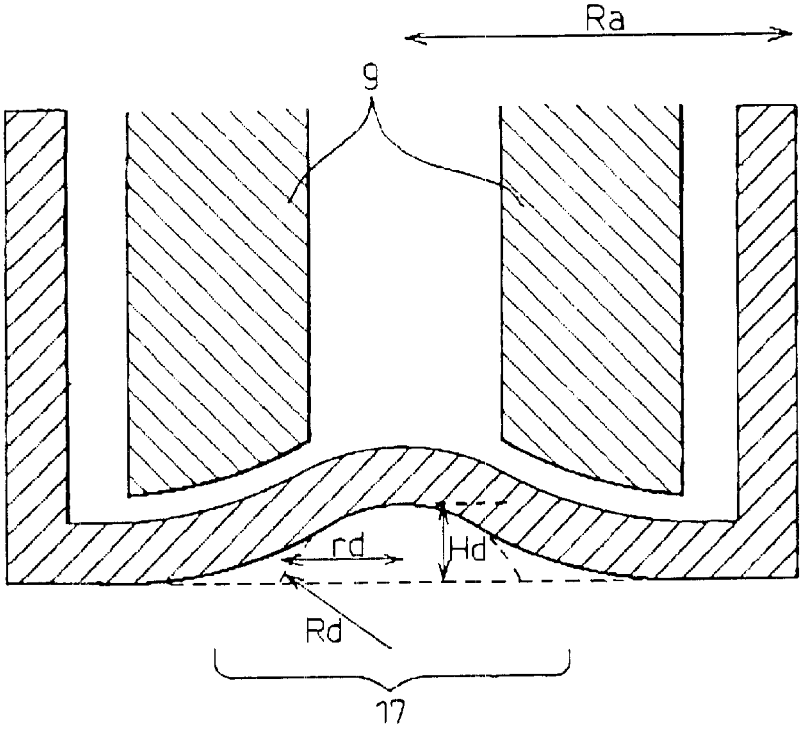
FIG. 6 is a view showing a vertical cross section of one embodiment of a transferred plasma heating anode according to the present invention.
Figure 7:
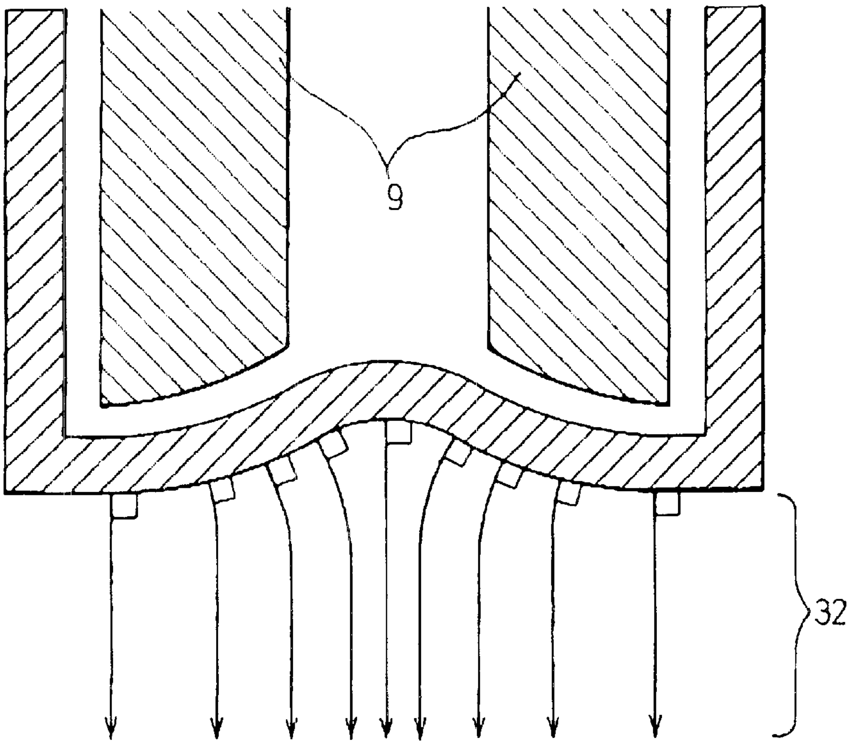
FIG. 7 is a view showing the outline of an electric field produced from the anode tip end in one embodiment of the transferred plasma heating device shown in FIG. 6.
Figure 25:
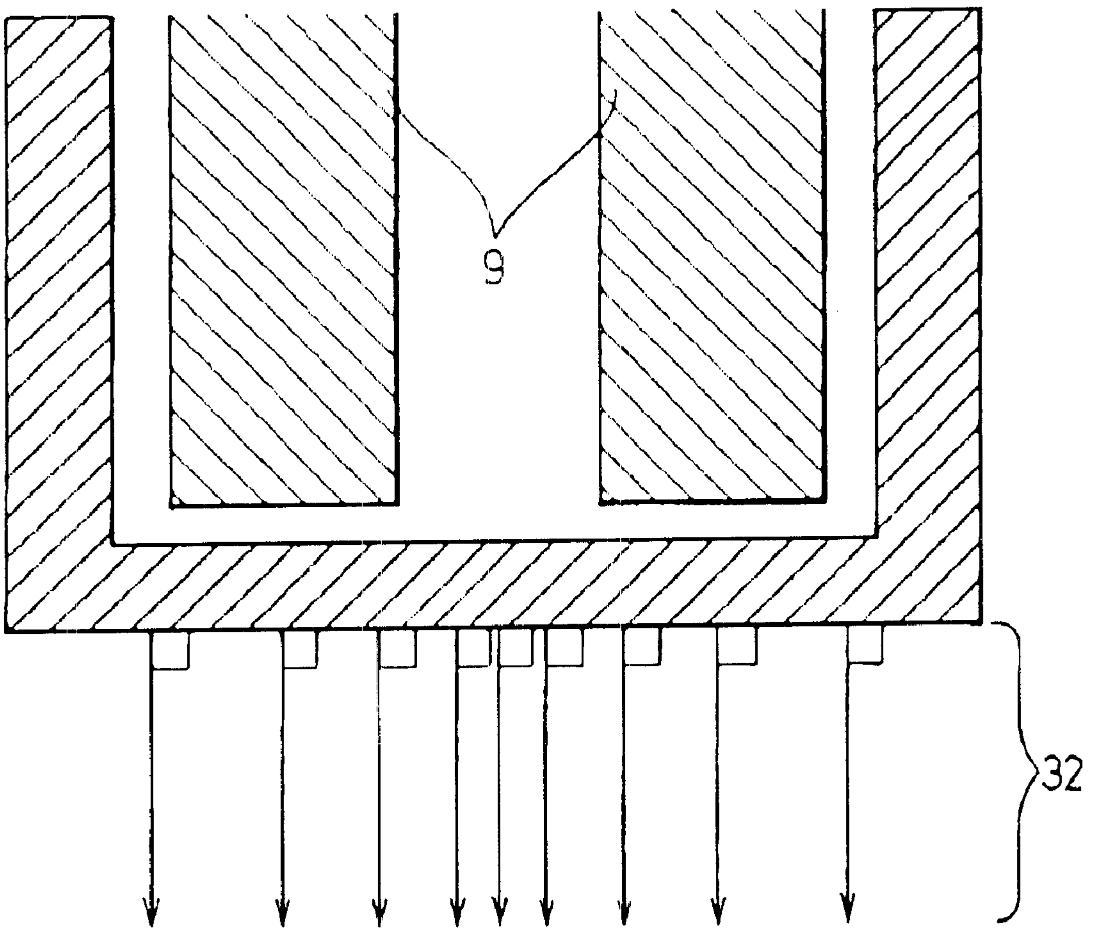
FIG. 25 is a view showing the outline of an electric field produced from an anode tip end in the conventional transferred plasma heating anode shown in FIG. 2.

In order to prevent current concentration in the central portion of the external surface at the anode tip end generated by a pinch effect associated with plasma, increasing the effective area of the anode can be considered. However, the effective area of the anode sometimes cannot be increased sufficiently for the following reasons: a problem in arranging the installation; and a problem in limitations of a torch holder arising from an increase in the mass of the torch due to the enlargement of the anode. Accordingly, current concentration in the central portion of the external surface at the anode tip end must be prevented by making the anode portion have an appropriate shape. FIG. 6 shows an embodiment of the present invention (invention in (1) mentioned above) that employs such a shape. In FIG. 6, a central portion 17 of the external surface at an anode tip end is recessed. Since an electric field 32 is vertically incident on a conductor surface as shown in FIG. 7, the dielectric flux density in the central portion of the external surface at the anode tip end can be lowered, and current concentration can be prevented in comparison with a comparative instance shown in FIG. 25 by recessing the central portion thereof.

In order to ensure a current concentration-preventive region, the region of the recessed portion is desirably a circle having a radius equal to from ⅕ to ¾ of the radius Ra of the anode tip end (see FIG. 6) from the center of the anode tip end. In order to ensure a current diffusion effect, the central height Hd of the recessed portion is desirably from ⅓ to 2/1 of the radius Rd of the region of the recessed portion (see FIG. 6). Moreover, in the present invention, the gas supplied from the gas supply means may be a gas containing 100% of Ar or a gas containing at least 75% of Ar, 0.1 to 25% of $N_2$ for increasing a voltage, the balance being unavoidable impurities.

Figure 8:
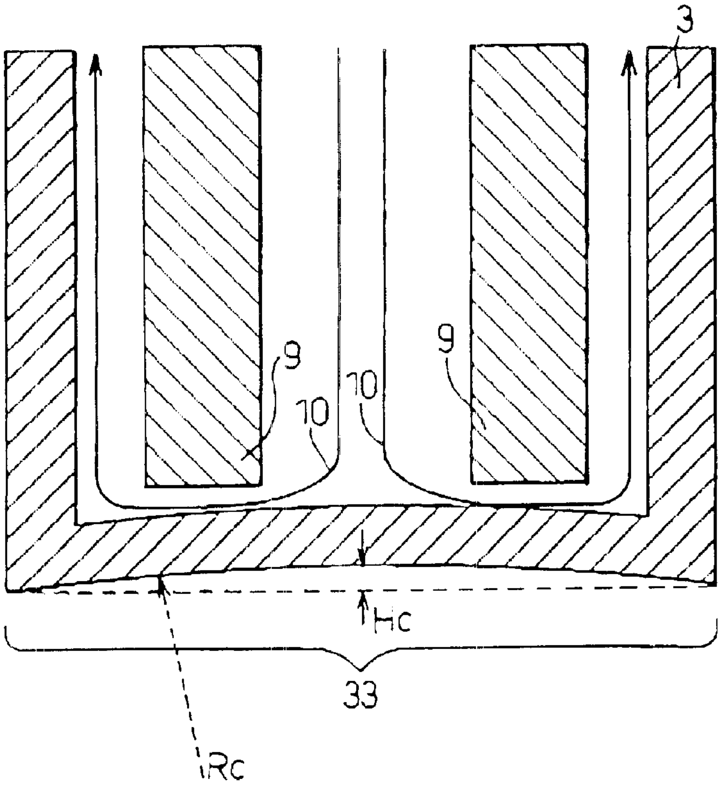
FIG. 8 is a view showing a vertical cross section of another embodiment of a transferred plasma heating anode according to the present invention.

In the invention in (2) mentioned above, FIG. 8 shows one embodiment of the shape of the external surface of the anode tip end for preventing a protruded deformation of the anode tip end. In FIG. 8, in order to cancel a protruded deformation produced by water pressure and thermal stress applied to the anode tip, a recess (crown) is formed in the inward direction in the whole 33 of the external surface at the anode tip end. In order to make the external surface maintain a horizontal surface even when the external surface of the anode tip end is deformed during plasma heating, the crown height Hc is desirably from 100 to 500 um.

The invention in (5) mentioned above is a combination of the invention in (1) and the invention in (2), and current concentration can be further prevented thereby.

Figure 9:
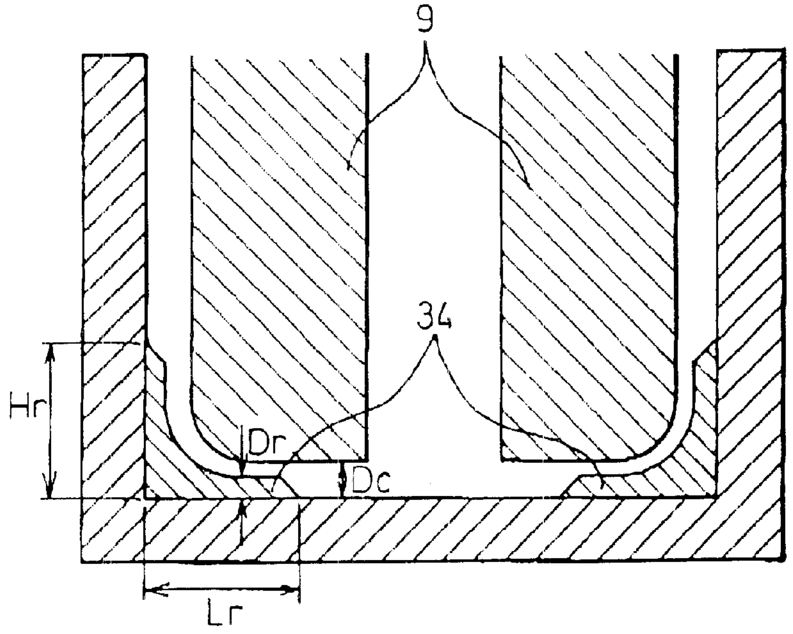
FIG. 9 is a view showing a vertical cross section of another embodiment of a transferred plasma heating anode according to the present invention.

In order to prevent the protruded deformation of the anode tip end, the rigidity of the anode tip end must be kept high even when the anode tip end is in a high temperature state. In the invention in (3) or (9) mentioned above, ribs are provided to the cooling surface side of the anode tip end in order to maintain a high rigidity. FIG. 9 shows a vertical cross section of the anode in which ribs 34 are provided to the external peripheral portion on the cooling surface side of the anode tip end. At least one rib 34, and preferably at least four ribs 34, are circumferentially provided at equal intervals.

In order for the ribs 34 not to hinder the flow of cooling water while maintaining the high rigidity, the ribs 34 preferably each have the following dimensions: a height Hr of ⅕ to ⅔ of Ra (wherein Ra is the radius of the anode tip end); a length Lr in the radius direction of ⅕ to ⅔ of Ra; and a width Dr of ¼ to ¹⁄₁ of Dc (wherein Dc is the width of a cooling water path of the anode tip end). However, when the ribs are to be provided within a cooling surface, the shapes of the cooling water path and partition must be changed. Accordingly, a high strength material such as a Cr—Cu alloy, a Zr—Cu alloy or a Cr—Zr—Cu alloy is desirably used in order to maintain a high rigidity of the ribs.

Current concentration in the central portion of the external surface at the anode tip end can be prevented by employing the procedures explained above. However, when an anode spot is formed, current concentration further takes place at the anode spot as explained above. Therefore, when an anode spot is formed at a site other than the central portion of the external surface at the anode tip end, there is a possibility that current concentration is generated at the anode spot. Embodiments of the present invention (invention in (4) and invention in (11) mentioned above) in which disturbance generators are used for preventing the anode spot formation are shown in FIGS. 10, 11.

Figure 10:
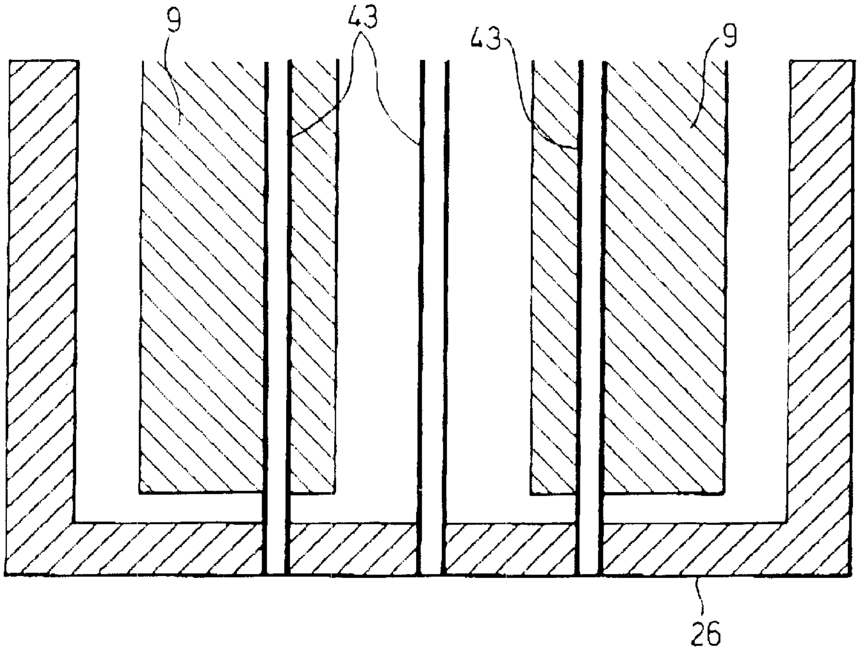
FIG. 10 is a view showing a vertical cross section of another embodiment of a transferred plasma heating anode according to the present invention.
Figure 11:
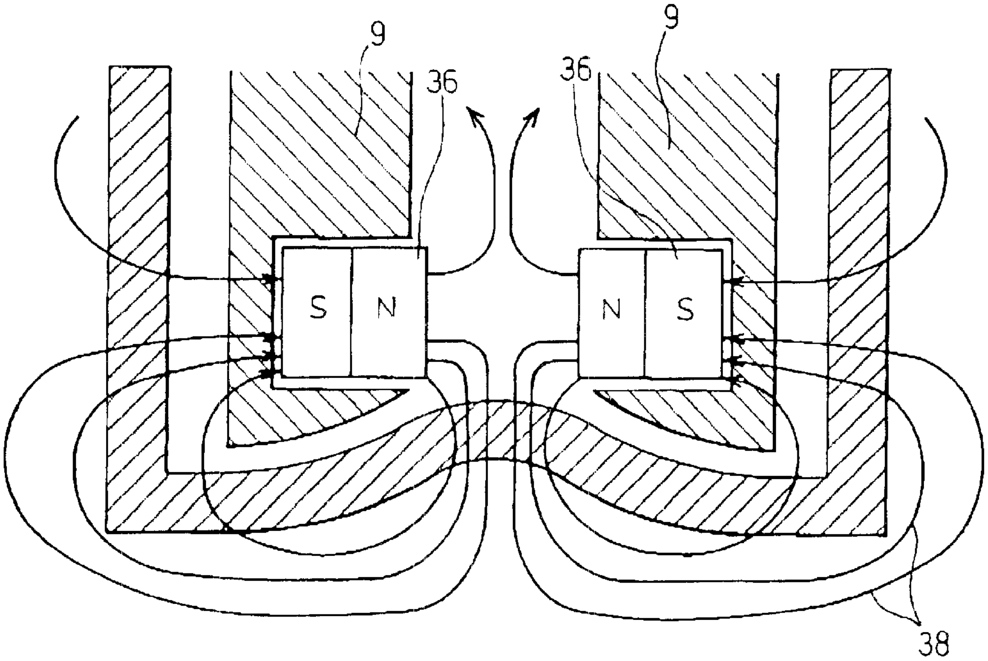
FIG. 11 is a view showing a vertical cross section of another embodiment of a transferred plasma heating anode according to the present invention.
Figure 30:
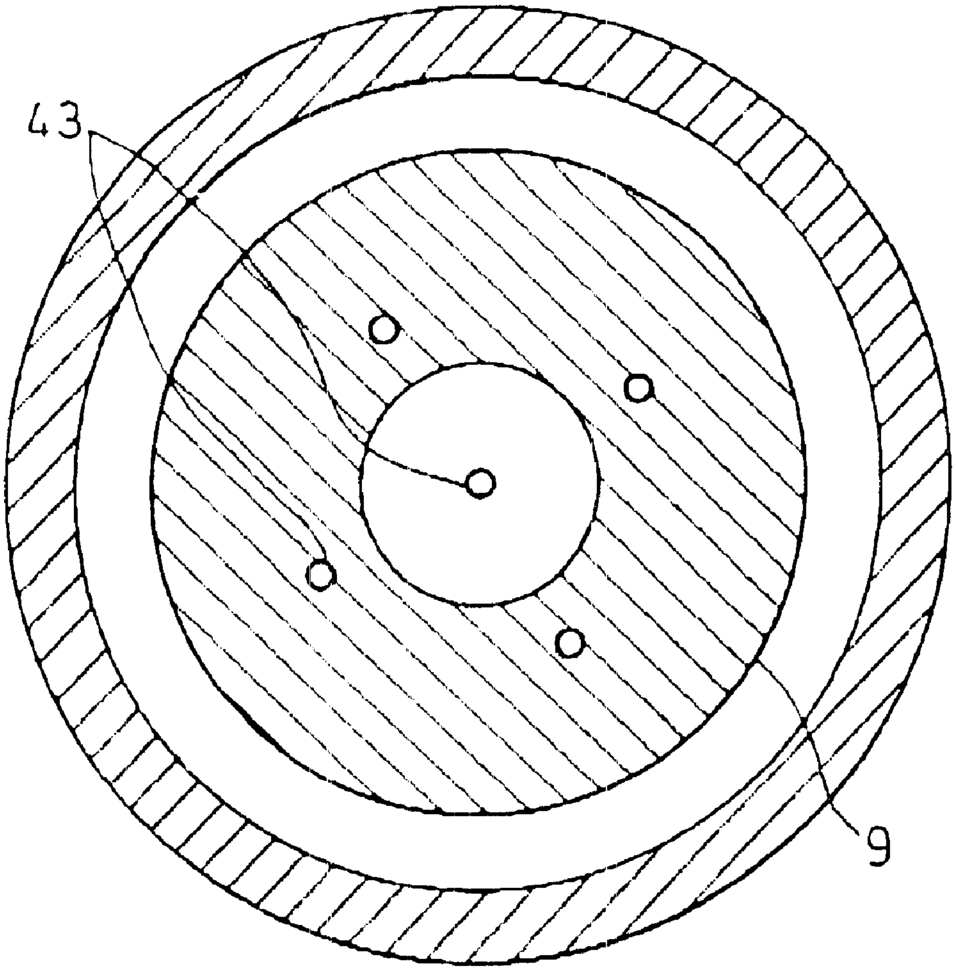
FIG. 30 is a view showing a horizontal cross section of the transferred plasma heating anodes shown in FIGS. 10, 12, 19 and 21.
Figure 31:
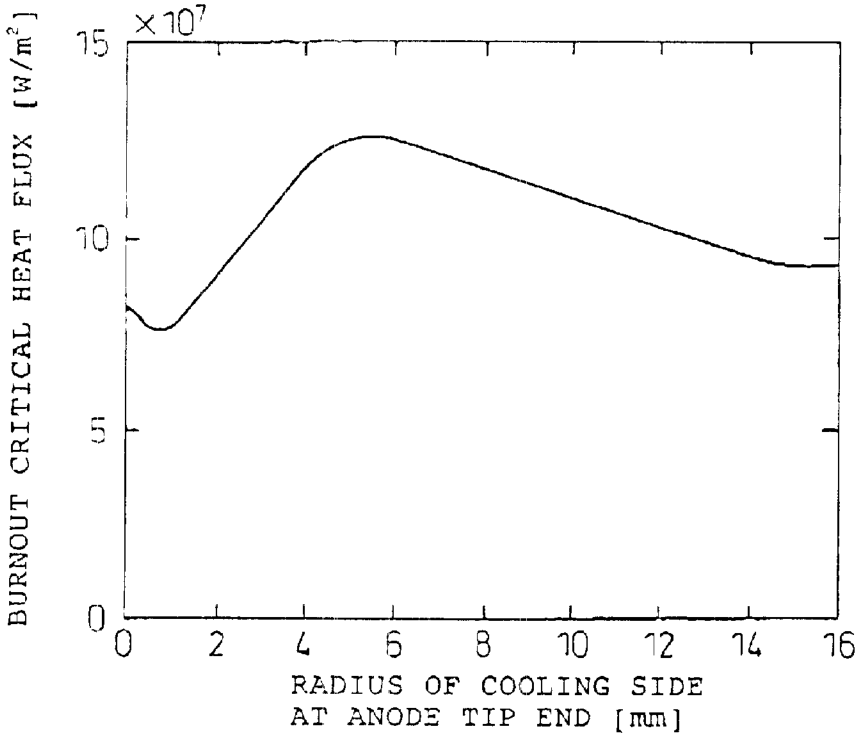
FIG. 31 is a graph showing the distribution of a burnout critical heat flux on the heat transfer surface of the cooling side at a conventional anode tip end.

As shown in FIG. 10, the invention in (4) mentioned above can move an anode spot by providing a second gas supply means 43 that blows a plasma action gas from an external surface 26 of the anode tip end to cause turbulence and rotation of the gas flow near the external surface 26 of the anode tip end. The second gas supply means 43 preferably is a cylindrical tube that penetrates the external surface of the anode tip end, and the cylindrical tube is made to have an outside diameter of preferably 1 to 5 mm to be able to surely supply the gas without hindering the flow of cooling water. Stainless steel, copper or copper plated with a corrosion-preventive metal is preferably used as the material of the cylindrical tube to prevent corrosion. Moreover, although the effect of moving an anode spot can be obtained with one cylindrical tube alone, the cylindrical tubes are provided in the following manner as shown in FIGS. 10, 30: one cylindrical tube is provided in the central portion of the anode, and 4 to 10 cylindrical tubes are provided within a partition 9 (provided within the anode) of a cooling water path at equal intervals in the circumferential direction.

Figure 13:
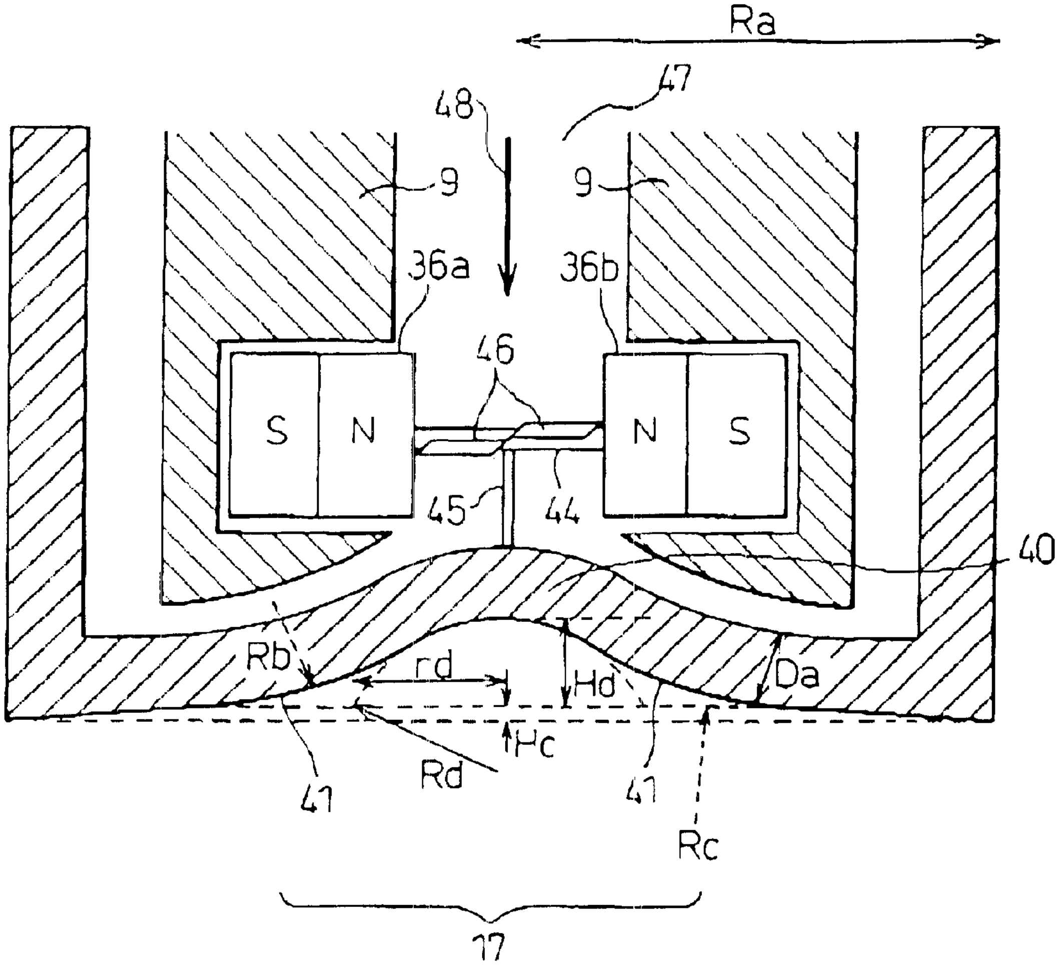
FIG. 13 is a view showing a vertical cross section of another embodiment of a transferred plasma heating anode according to the present invention.
Figure 28:
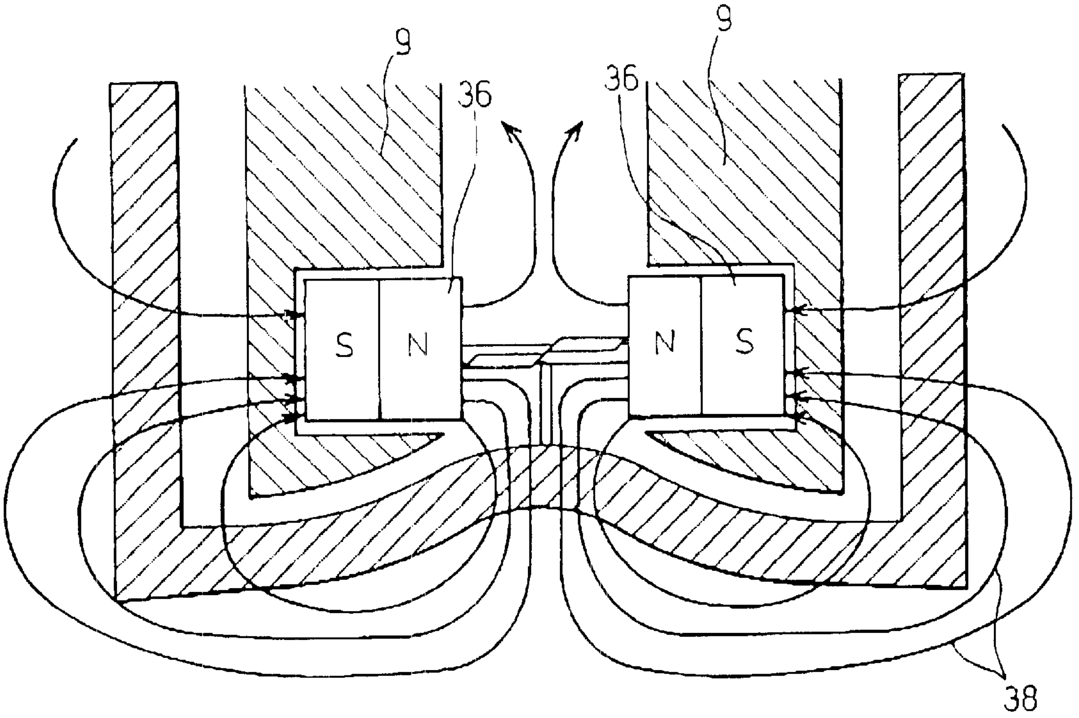
FIG. 28 is a view showing the outline of a magnetic field in the transferred plasma heating anode shown in FIG. 13.

In the invention in (11) mentioned above, as shown in FIG. 11, permanent magnets 36 are embedded in the interior of the anode, and the permanent magnets 36 are rotated to form an external magnetic field 38 (see FIG. 28) that varies with time. As a result, the anode spot can be moved. As shown in FIG. 13, blades 46 that connect the permanent magnets are provided in the cooling water path, and the permanent magnets can be rotated by the flow of the cooling water.

In order to maintain a high rigidity, a copper alloy that can maintain a high strength is used for the anode tip end in the invention in (12) mentioned above provided that the copper alloy must have a heat conductivity that is about the same as or greater than that of oxygen-free copper that is a conventional material in order to keep the external surface temperature of the anode tip end low. Examples of the copper alloy that satisfies such conditions include a Cr—Cu alloy, a Zr—Cu alloy and a Cr—Zr—Cu alloy. A commercially available copper alloy comprising 0.5 to 1.5% of Cr, 0.80 to 0.30% of Zr and the balance of copper is an example of the Cr—Zr—Cu alloy.

Figure 14:
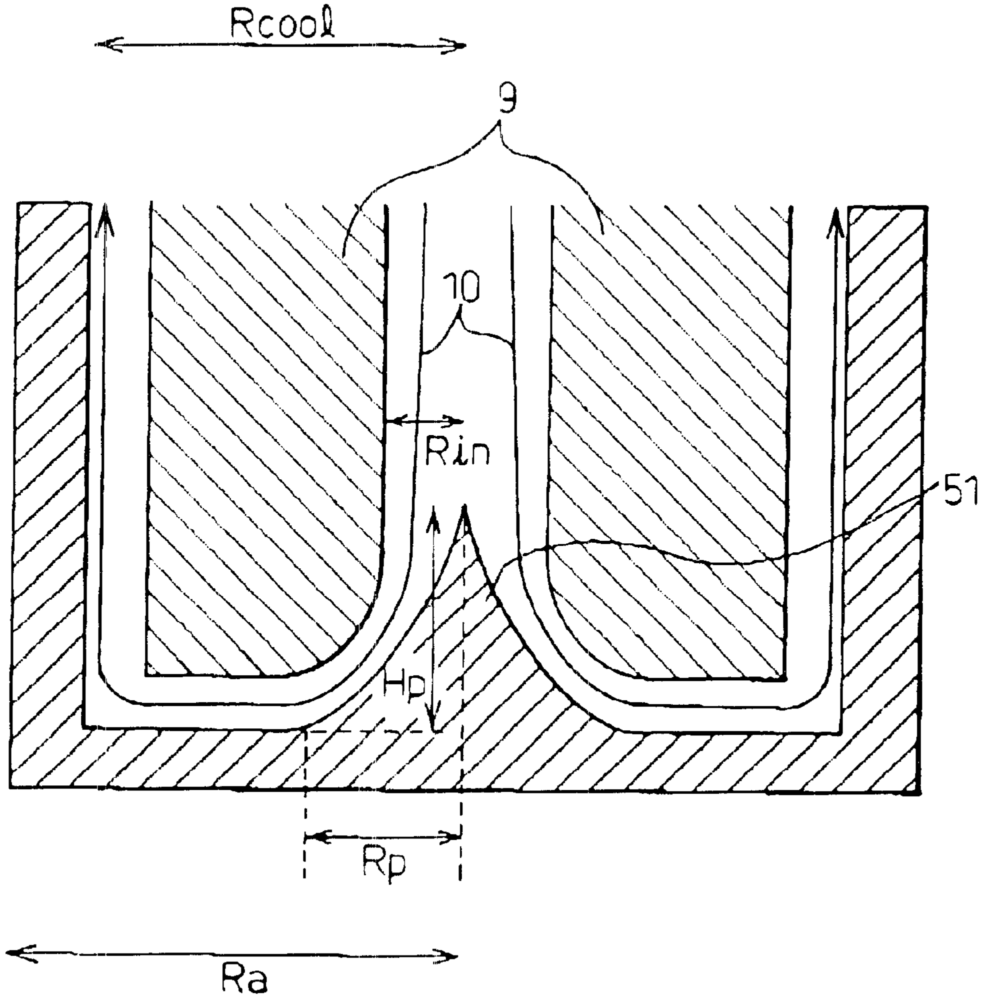
FIG. 14 is a view showing a vertical cross section of another embodiment of a transferred plasma heating anode according to the present invention.

In order to prevent burnout of the cooling heat transfer surface, increasing the effective area of the anode can be considered. However, the effective area of the anode sometimes cannot be increased sufficiently for the following reasons: a problem of arranging the installation; and a problem of a limitation in a torch holder installation arising from an increase in the mass of the torch due to the enlargement of the anode. Accordingly, generation of burnout must be prevented by making the anode tip end portion have an appropriate shape. FIG. 14 shows an embodiment of the present invention (invention in (6) mentioned above) that employs such a shape.

As shown in FIG. 14, a projection 51 for smoothing a flow 10 of cooling water is provided in the center on the cooling side of the anode tip end. The projection 51 forms an approximately conical shape, and the side face is streamlined with respect to the flow 10 of cooling water. The flow speed of the cooling water can be prevented from falling in the central portion on the cooling water side of the anode tip end by the projection 51, and the burnout critical heat flux can be improved. In order to effectively prevent the flow speed of the cooling water from falling, the projection preferably has the following dimensions; a radius Rp of the bottom of the projection of ¹⁄₁ to ²⁄₁ of Rin (wherein Rin is an inside radius of a partition 9); and a height Hp of the projection of ¹⁄₁ to ³⁄₁ of Rin.

Figure 15:
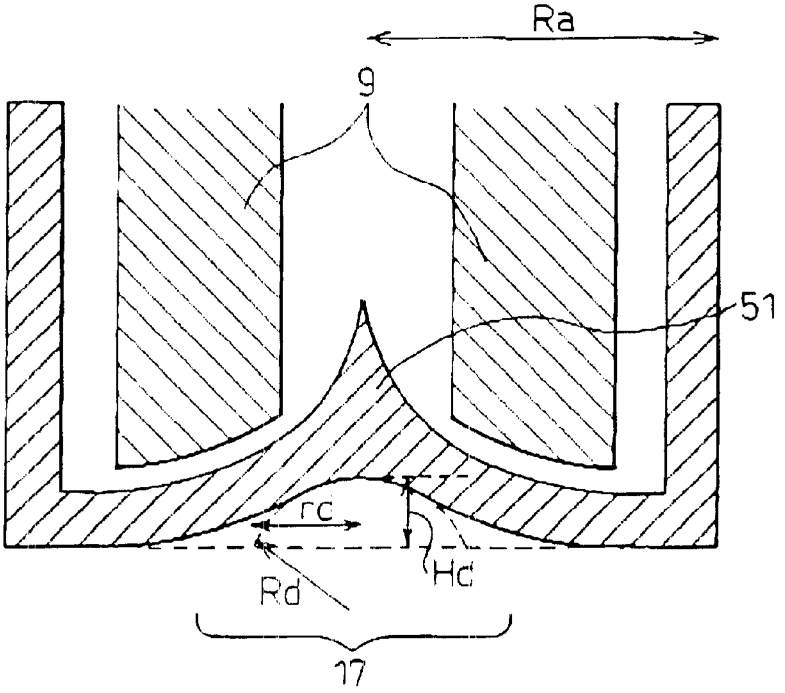
FIG. 15 is a view showing a vertical cross section of another embodiment of a transferred plasma heating anode according to the present invention.

FIG. 15 shows one embodiment of the present invention (invention in (7) mentioned above) that is intended to prevent current concentration in the central portion on the external surface of the anode tip end by making the anode tip end portion have an appropriate shape.

Figure 16:
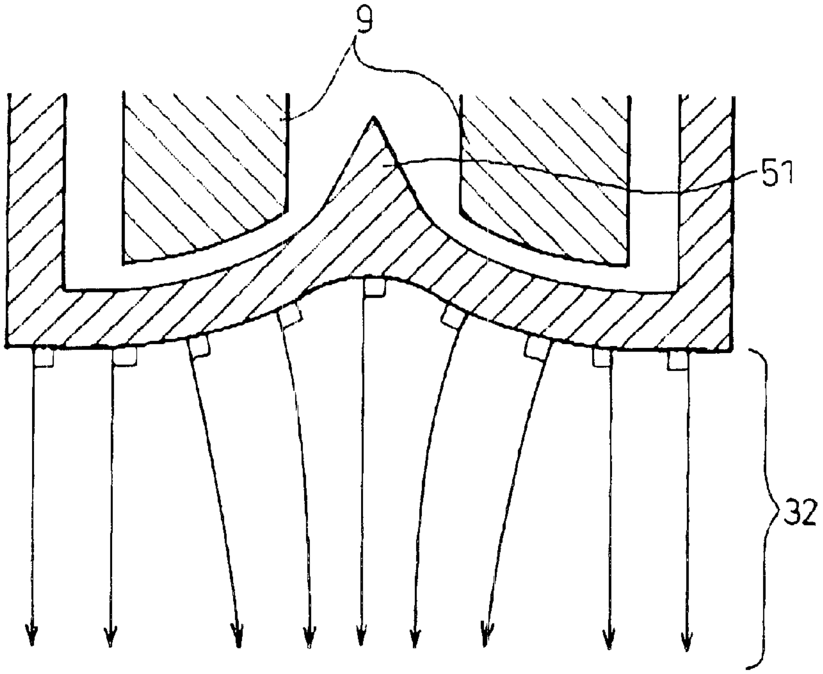
FIG. 16 is a view showing the outline of an electric field produced from an anode tip end in one embodiment of a transferred plasma heating anode shown in FIG. 15.

As shown in FIG. 15, in the invention in (7) mentioned above, a central portion 17 of the external surface at the anode tip end is recessed. As shown in FIG. 16, an electric field 32 is vertically incident on the conductor surface. As a result, the dielectric flux density in the central portion of the external surface at the anode tip end can be lowered in comparison with the comparative example shown in FIG. 25 by recessing the central portion of the external surface at the anode tip end, and current concentration can thus be prevented.

In order to ensure a current concentration-preventive region, the region of the recessed portion is desirably a circle having a radius of ⅕ to ¾ of Ra (wherein Ra is the radius of the anode tip end) with its center placed at the center of the anode tip end (see FIG. 15). Moreover, in order to ensure the current diffusion effect, the center height Hd of the recessed portion is desirably from ⅓ to 2/1 of Rd (wherein Rd is the radius of the region of the recessed portion) (see FIG. 15). Furthermore, the radius Rd of the region of the recessed portion is preferably from ⅓ to ¾ of Ra (wherein Ra is the radius of the external surface at the anode tip end). Still furthermore, a gas supplied from a gas supply means in the present invention may be a gas containing 100% by volume of Ar, or a gas containing at least 75% by volume of Ar, 0.1 to 25% by volume of $N_2$ (for increasing a voltage), and a balance of unavoidable impurities. Moreover, an increase in the thickness of the central portion at the anode tip end caused by providing the projection 51 can be decreased by recessing the central portion of the external surface at the anode tip end, and the distance from the cooling surface is also shortened. As a result, the effect of lowering the temperature of the external surface at the anode tip end can also be provided.

Figure 17:
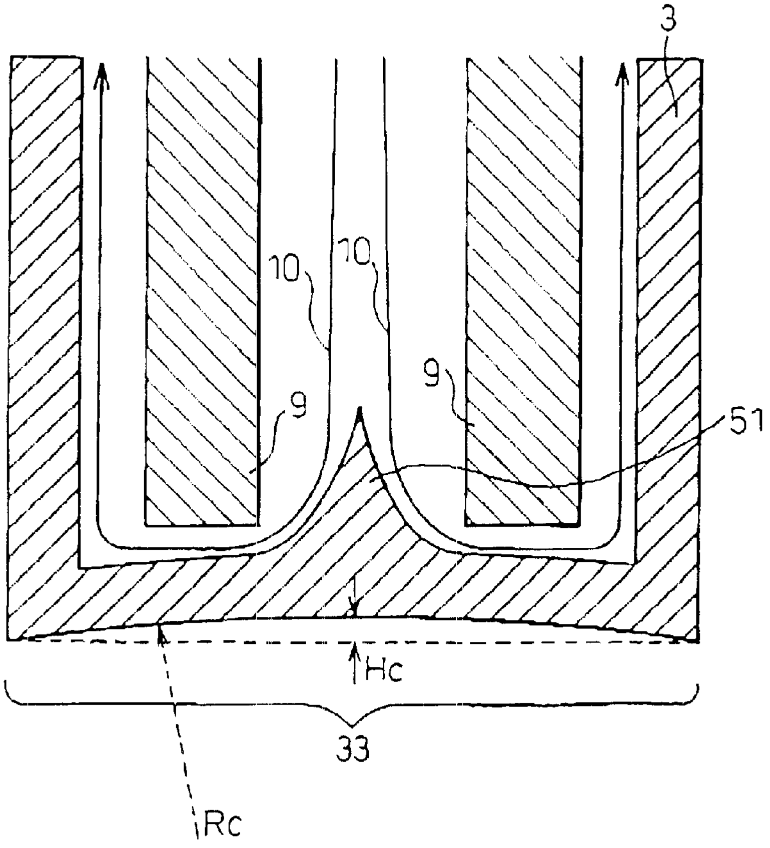
FIG. 17 is a view showing a vertical cross section of another embodiment of a transferred plasma heating anode according to the present invention.

FIG. 17 shows one embodiment of the shape of the external surface at the anode tip end for preventing protruded deformation of the anode tip end, which embodiment is adopted by the invention in (8) mentioned above. In FIG. 17, in order to cancel protruded deformation produced by water pressure and thermal stress applied to the anode tip end, the whole 33 of the external surface at the anode tip end is inwardly recessed (a crown being formed). In order for the external surface to maintain a horizontal surface even when the external surface of the anode tip end is deformed during plasma heating, the height Hc of the crown is desirably from 100 to 500 μm.

In order to prevent protruded deformation at the anode tip end, the rigidity of the anode tip end must be kept high even when the anode tip end is in a high temperature state. In order to maintain high rigidity, ribs are provided on the cooling surface side of the anode tip end in the invention in (9) mentioned above.

Figure 18:
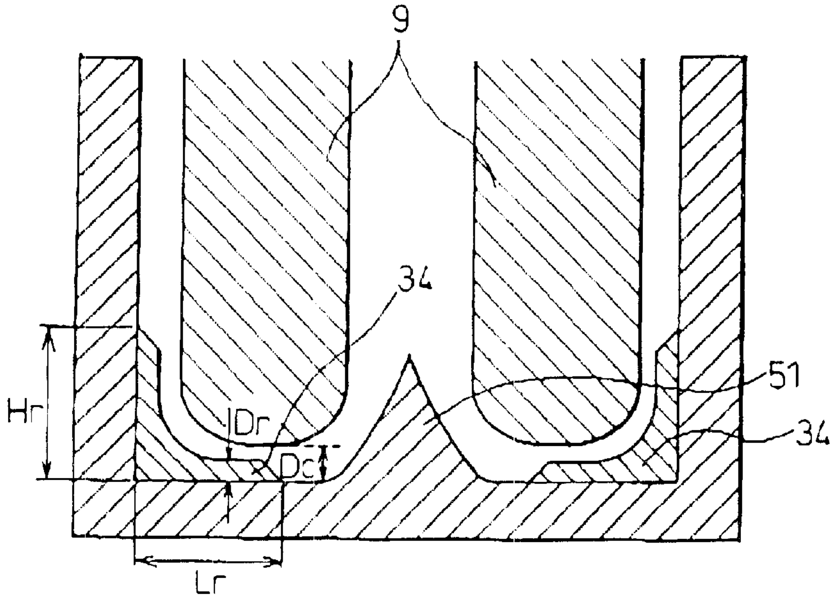
FIG. 18 is a view showing a vertical cross section of another embodiment of a transferred plasma heating anode according to the present invention.

FIG. 18 shows a vertical cross section of the anode in which ribs 34 are provided in the peripheral portion on the cooling surface side of the anode tip end. At least one rib 34, preferably at least four ribs 34 are provided in the circumferential direction at equal intervals. In order for the ribs 34 not to hinder the flow of cooling water while maintaining the high rigidity, the ribs 34 preferably each have the following dimensions: a height Hr of ⅕ to ⅔ of Ra (wherein Ra is the radius of the anode tip end); a length Lr in the radial direction of ⅕ to ⅔ of Ra; and a width Dr of ¼ to 1/1 of DC (wherein Dc is a path width of cooling water at the anode tip end). However, when the ribs are to be provided within the cooling surface, the shapes of the cooling water path and partition must be changed. Accordingly, a high strength material such as a Cr—Cu alloy, a Zr—Cu alloy or a Cr—Zr—Cu alloy is desirably used in order to maintain a high rigidity of the ribs.

Figure 19:
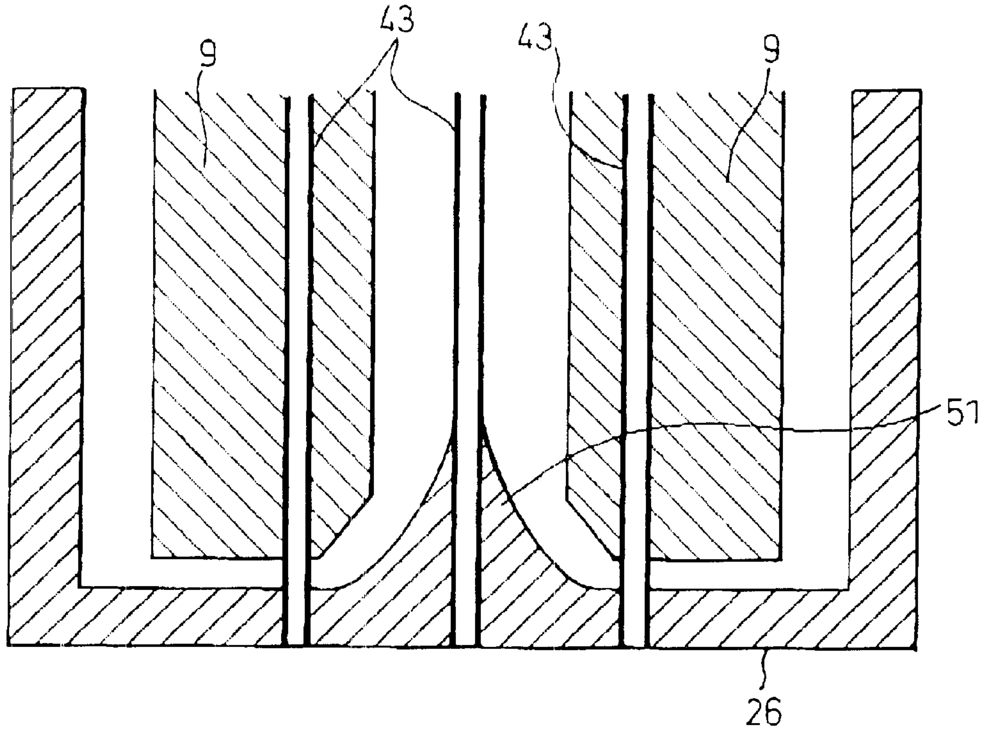
FIG. 19 is a view showing a vertical cross section of another embodiment of a transferred plasma heating anode according to the present invention.
Figure 20:
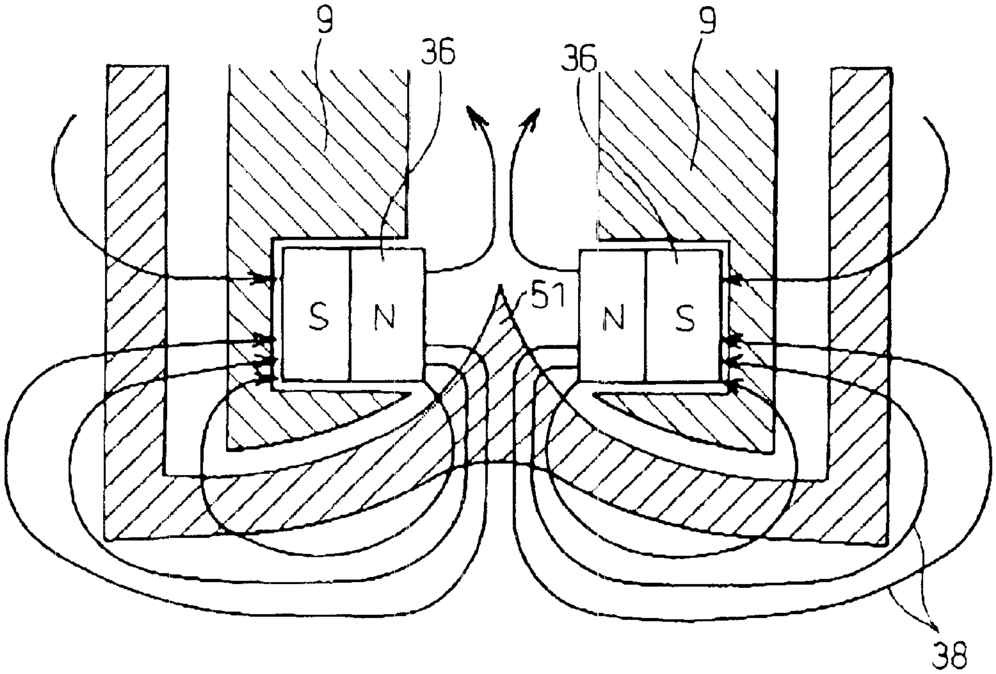
FIG. 20 is a view showing a vertical cross section of another embodiment of a transferred plasma heating anode according to the present invention.

Current concentration in the central portion of the external surface at the anode tip end can be prevented by employing the procedures explained above. However, once an anode spot is formed, current concentration is further produced at the anode spot as explained above. Therefore, when an anode spot is formed at a site other than the central portion of the external surface at the anode tip end, there is a possibility that current concentration is produced at the anode spot. FIGS. 19, 20 show embodiments of the present invention (invention in (10) and invention in (11) mentioned above) in which disturbance generators are used for preventing the anode spot formation.

As shown in FIG. 19, the invention in (10) mentioned above can move the anode spot by providing a second gas supply means 43 that blows a plasma action gas from an external surface 26 of the anode tip end to cause turbulence and rotation of a gas flow near the external surface 26 of the anode tip end. The second gas supply means 43 preferably is a cylindrical tube that penetrates the external surface of the anode tip end, and the cylindrical tube is made to have an outside diameter of preferably 1 to 5 mm to be able to surely supply the gas without hindering the flow of cooling water. Stainless steel, copper or copper plated with a corrosion-preventive metal is preferably used as the material of the cylindrical tube for the purpose of preventing corrosion. Moreover, although the effect of moving an anode spot can be obtained even with one cylindrical tube alone, cylindrical tubes are preferably provided in the following manner as shown in FIGS. 19 and 30: one cylindrical tube is provided in the central portion of the anode, and 4 to 10 cylindrical tubes are provided within partition 9 of a cooling water path in the anode at equal intervals in the circumferential direction.

Figure 22:
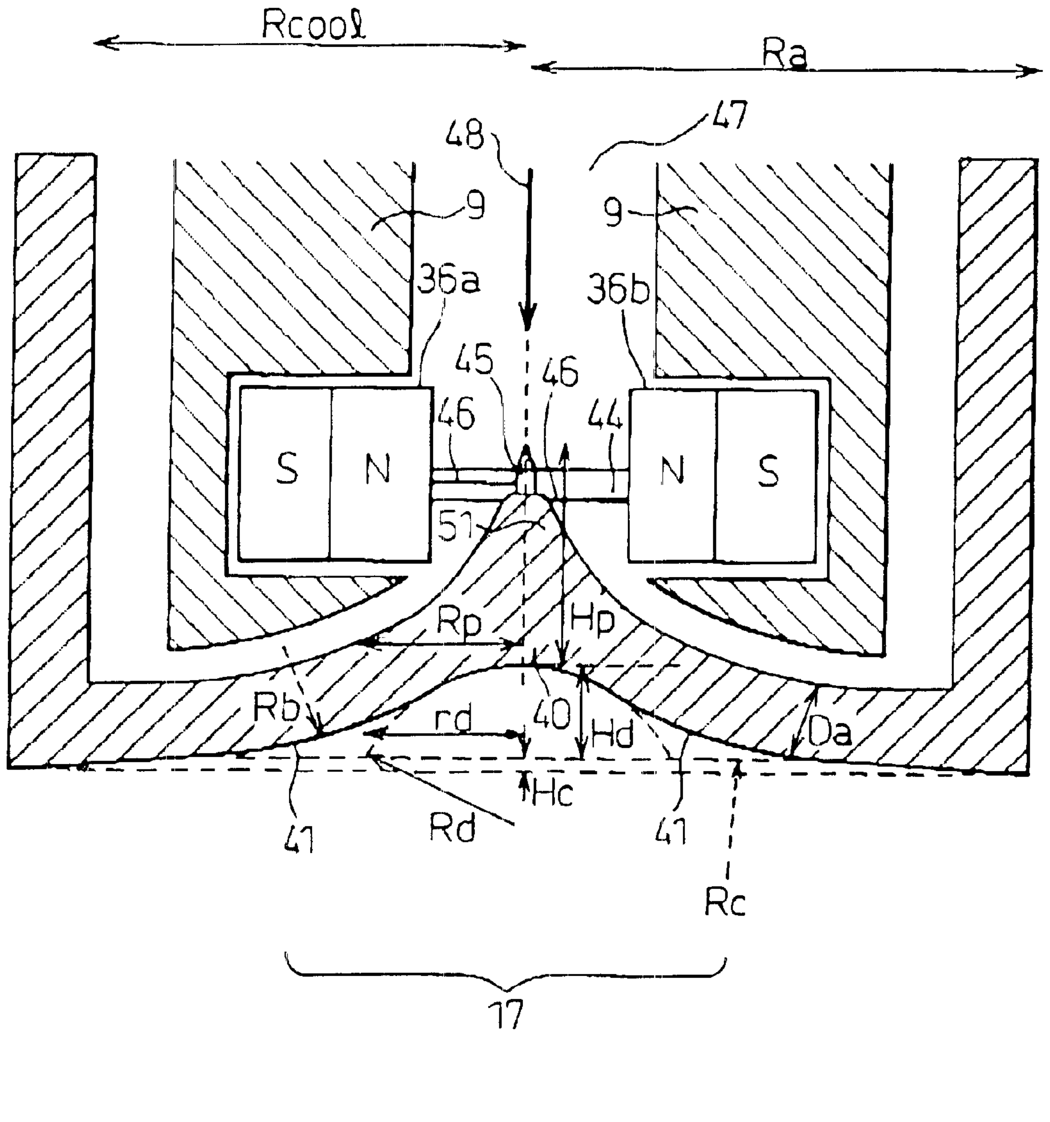
FIG. 22 is a view showing a vertical cross section of another embodiment of a transferred plasma heating anode according to the present invention.
Figure 29:
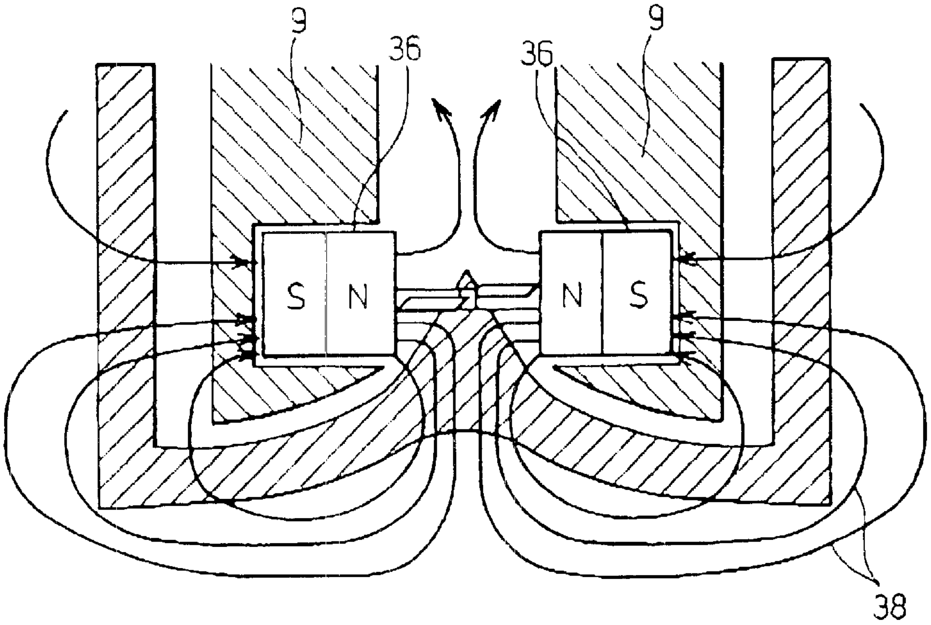
FIG. 29 is a view showing the outline of a magnetic field in the transferred plasma heating anode shown in FIG. 20.

In the invention in (11) mentioned above, as shown in FIG. 20, permanent magnets 36 are embedded in the interior of the anode, and the permanent magnets 36 are rotated to form an external magnetic field 38 (see FIG. 29) that varies with time. As a result, the anode spot can be moved. As shown in FIG. 22, blades 46 that connect the permanent magnets are provided in the cooling water path, and the permanent magnets can be rotated by the flow of the cooling water.

In order to maintain a high rigidity, a copper alloy that can maintain a high strength is used for the anode tip end in the invention in (12) mentioned above provided that the copper alloy must have a heat conductivity that is about the same as or greater than that of oxygen-free copper that is a conventional material in order to keep the external surface temperature of the anode tip end low. Examples of the copper alloy that satisfies such conditions include a Cr—Cu alloy, a Zr—Cu alloy and a Cr—Zr—Cu alloy. A commercially available copper alloy comprising 0.5 to 1.5% of Cr, 0.08 to 0.30% of Zr and the balance of copper is an example of the Cr—Zr—Cu alloy.

The present invention will be explained below by making reference to examples.

EXAMPLE 1

FIGS. 12, 13, 26 and 27 are each a cross-sectional view showing one embodiment of the present invention.

Figure 12:
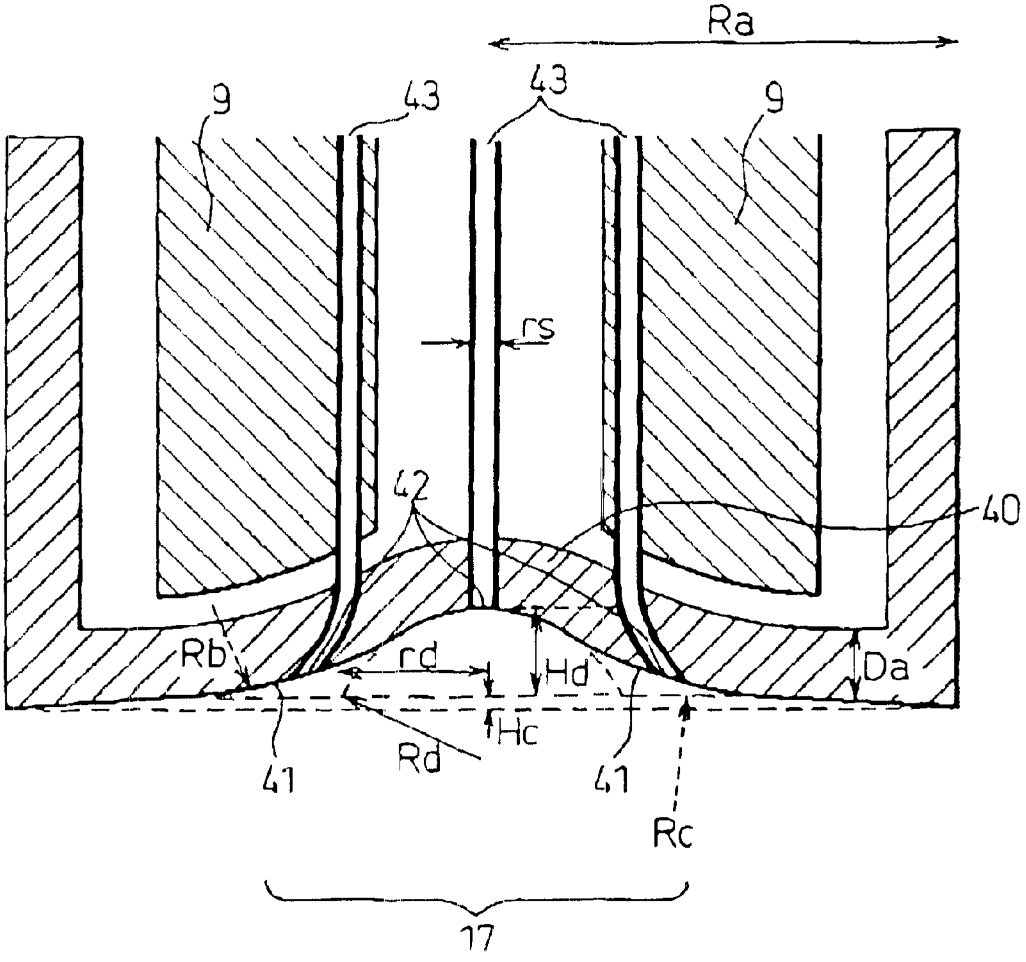
FIG. 12 is a view showing a vertical cross section of another embodiment of a transferred plasma heating anode according to the present invention.
Figure 26:
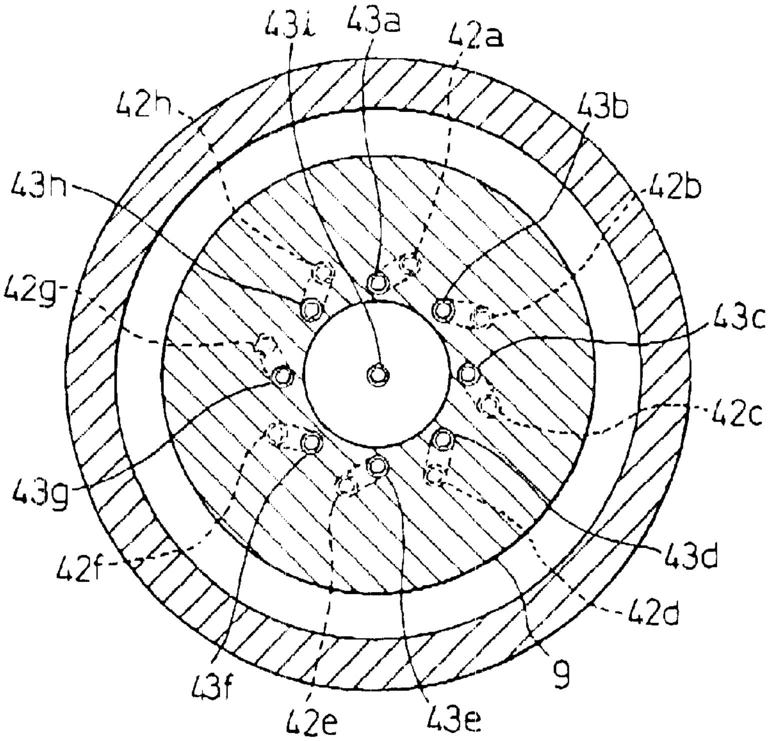
FIG. 26 is a view showing a horizontal cross section of the transferred plasma heating anode shown in FIGS. 12 and 21.

The features of the anode shown in FIGS. 12 and 26 are as described in (1) to (5) mentioned below. In addition, FIG. 12 is a vertical cross-sectional view and FIG. 17 is a horizontal cross-sectional view.

(1) The anode tip end has a radius Ra of the external surface of 25 mm, and a thickness Da of 3 mm.

(2) The recess (crown) of the whole of the external surface at the anode tip end has a spherical surface with a curvature Rc of 1,041 mm and has a height Hc of 300 μm in the center of the anode tip end. The crown structure makes the external surface of the anode tip end approximately planar during plasma heating due to thermal stress deformation.

(3) A spherical recessed portion 40 having a curvature Rd of 15 mm is formed at the area of a radius rd of 10 mm in the central portion 17 of the external surface at the anode tip end. The height Hd of the recessed portion 40 in the center of the anode tip end is 4 mm. The electric field incident on the central portion 17 of the external surface at the anode tip end is dispersed and the current density is lowered in comparison with the conventional type (see FIG. 25) without the recessed portion 40. In addition, a boundary 41 between the recessed portion of the external surface at the anode tip end and its outside must be smooth to avoid forming a large protruded portion. The curvature Rb of the boundary 41 is desirably at least 40 mm. In Example 1, Rb is determined to be 50 mm.

Figure 23:
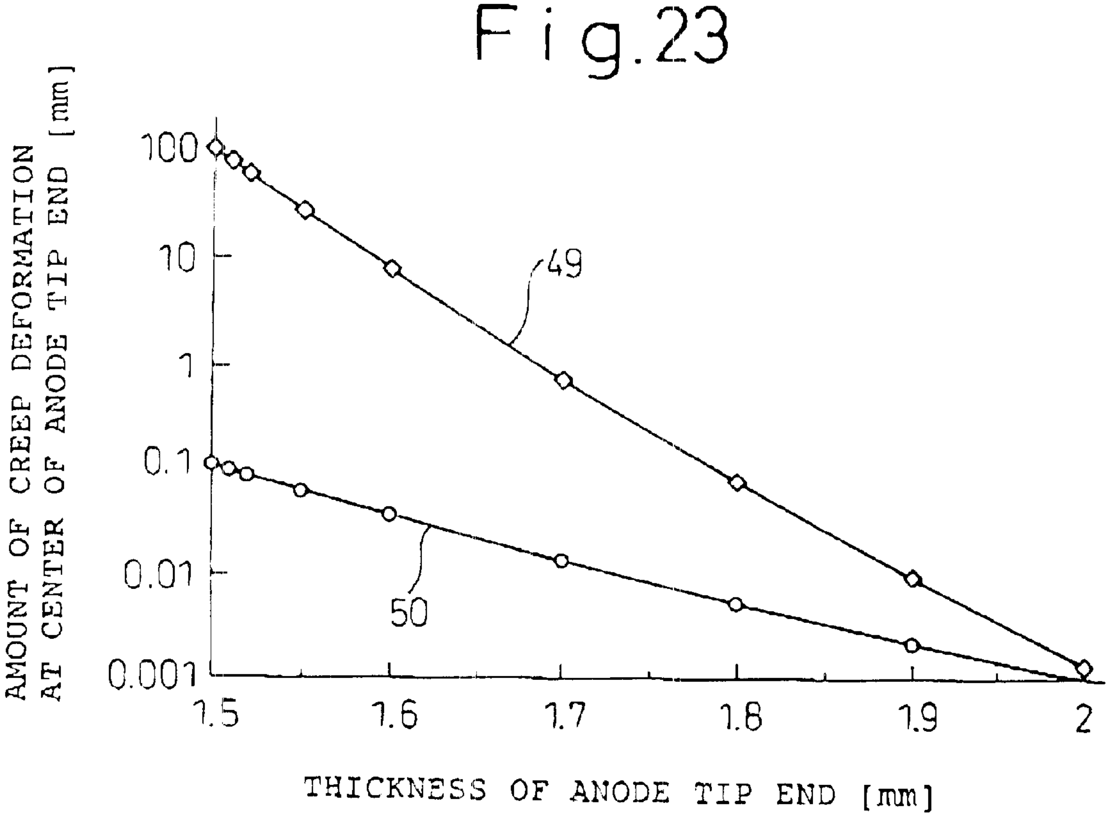
FIG. 23 is a graph that compares creep deformation amounts in anode tip ends on the basis of materials.
Figure 24:
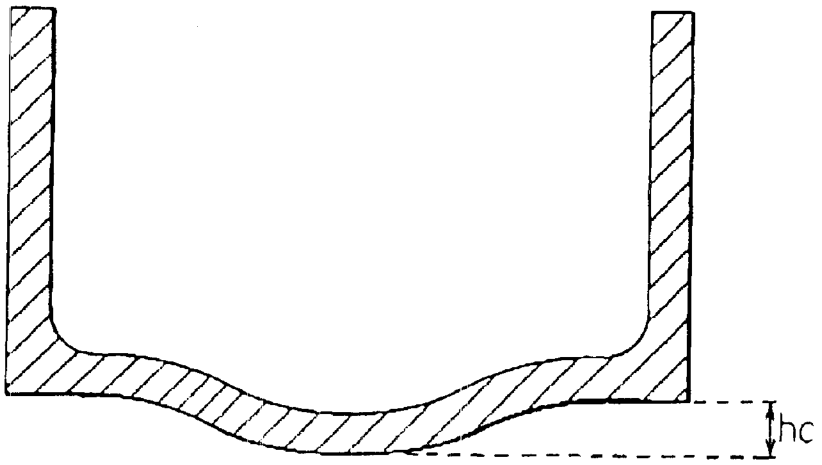
FIG. 24 is a view illustrating the results shown in FIG. 23.

(4) Since the external surface of the anode tip end is exposed to temperature as high as at least 500° C., the conventional anode in which oxygen-free copper is used may suffer creep deformation. In particular, when damage is increased on the external surface of the anode tip end and the tip end thickness is decreased, the amount of creep deformation is increased, and the anode tip end is deformed to have a protruded form. Therefore, a copper alloy containing 0.08% of Cr and 0.15% of Zr is used as the anode material. FIG. 23 shows a deformation amount (hc (mm) shown in FIG. 24) of creep deformation in the central portion of a copper (or copper alloy) disc having a radius of 25 mm against a thickness of the disc. In FIG. 23, the creep deformation of the Cr—Zr—Cu alloy shown by a line 50 (marked with ○) is small in comparison with that of oxygen-free copper shown by a line 49 (marked with ◇), and much smaller, by three orders of magnitude, when the anode tip end has a thickness of 1.5 mm. That is, the Cr—Zr—Cu alloy hardly shows creep deformation in comparison with oxygen-free copper, and the protrusion type deformation of the anode tip end can be suppressed.

(5a) Eight supply openings 42*a* to 42*h* that blow an action gas on the external surface of the anode tip end are provided along the circumference on the external surface thereof. Another supply opening 42*i* (not shown) is provided in the central portion of the external surface thereof. Inner tubes 43*a* to 43*h* which are connected to the supply openings 42*a* to 42*h*, respectively, and through which an action gas is passed are provided within the partition 9. Moreover, an inner tube 43*i* that is connected to the supply opening 42*i* (not shown) is provided on the anode central axis. The inner tubes 43*a* to 43*h* are obliquely provided in the lower portion of the anode so that the action gas is rotated. The action gas blown from the supply openings 42*a* to 42*i* rotates near the external surface thereof to move the anode spot.

Figure 1:
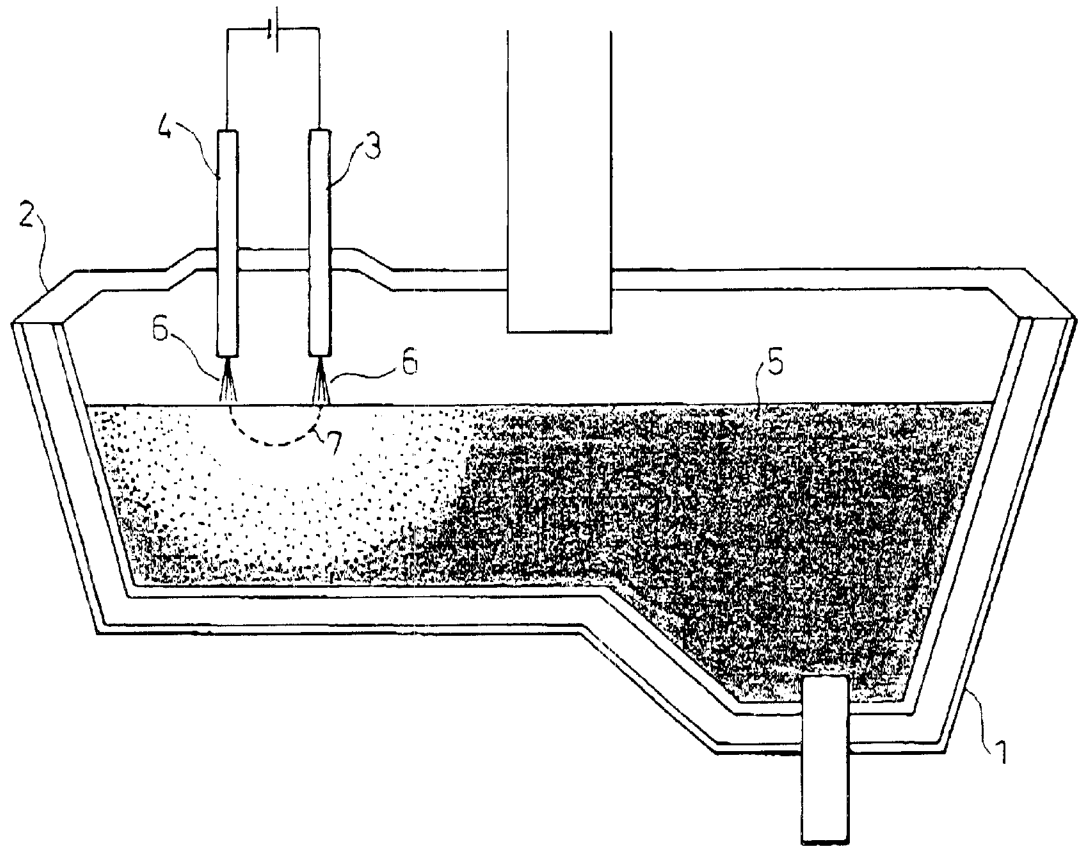
FIG. 1 is a view showing the outline of a tundish and a plasma torch.
Figure 2:
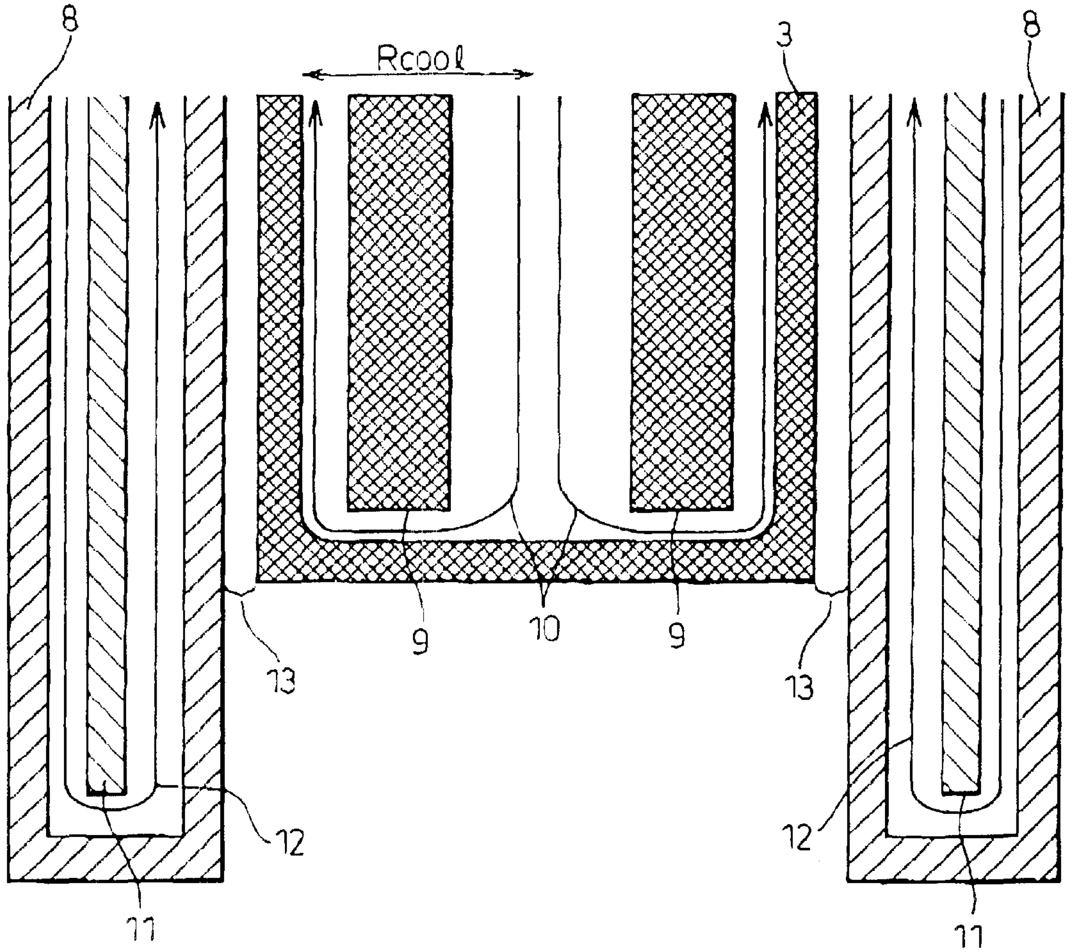
FIG. 2 is a view showing the outline of a conventional transfer mode of plasma heating anode that heats a molten steel in a tundish.
Figure 3:
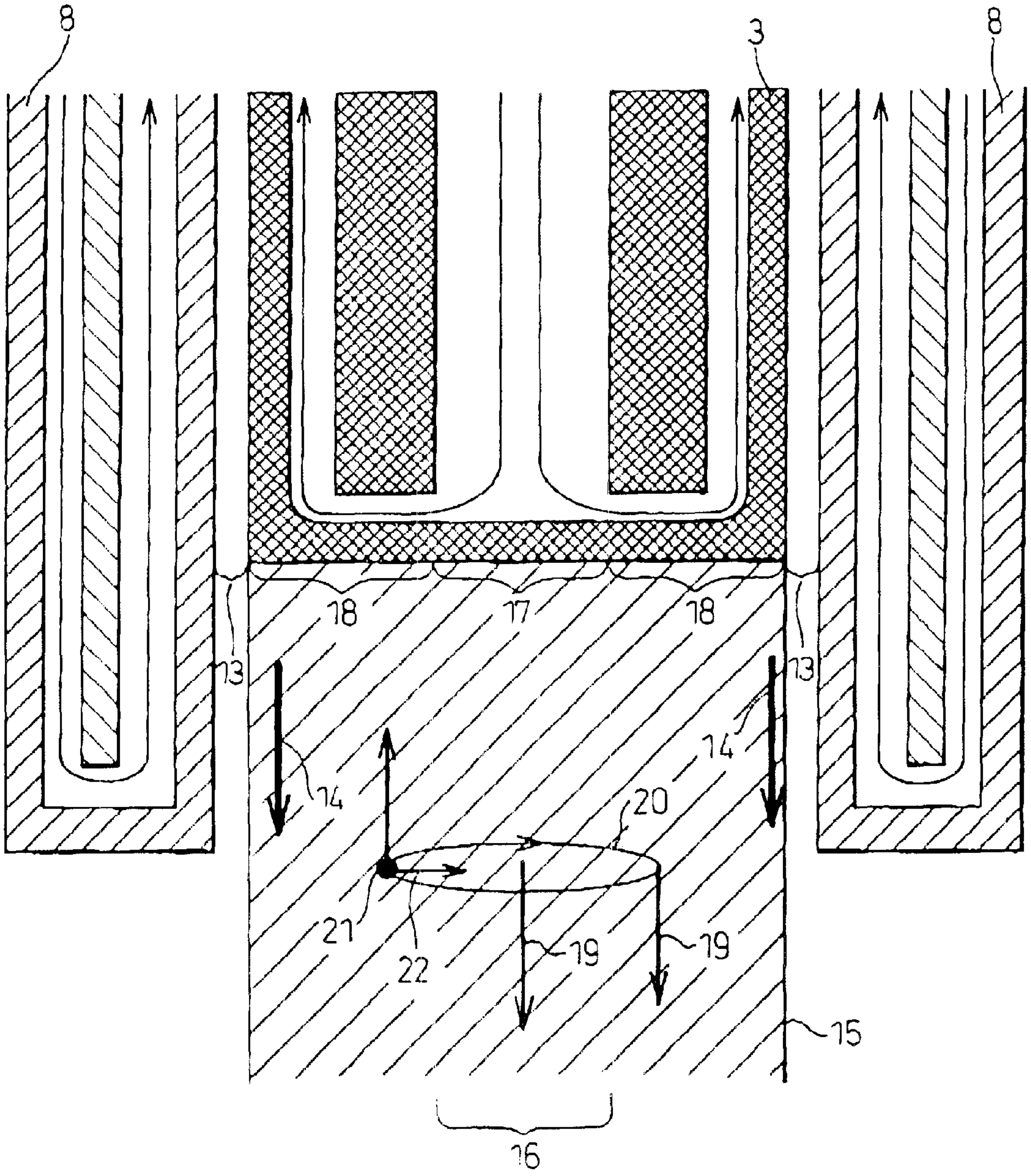
FIG. 3 is a view showing a pinch effect in plasma.
Figure 4:
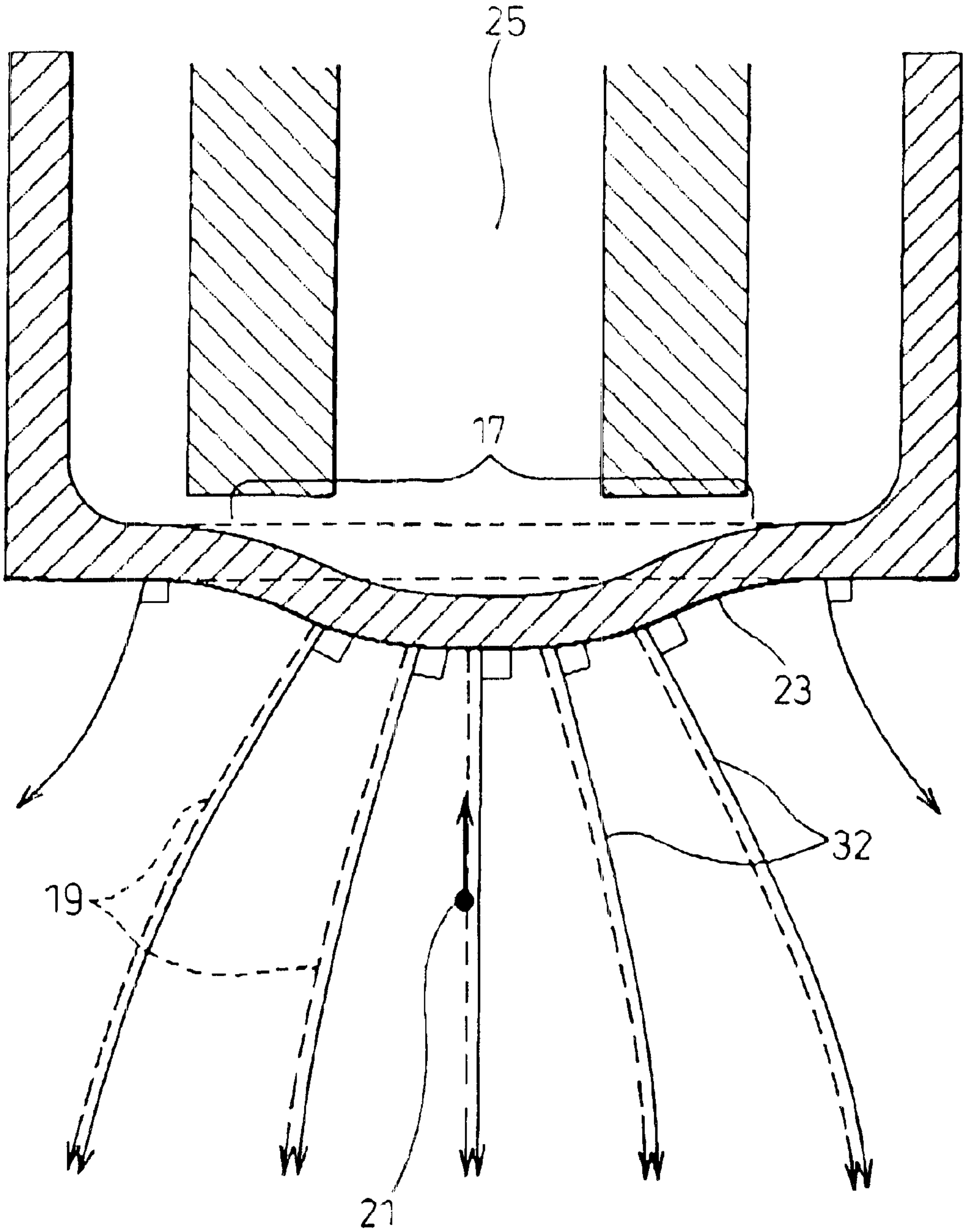
FIG. 4 is a view illustrating a current concentration on the central portion of the external surface at an anode tip end caused by protrusion deformation at the anode tip end.
Figure 5:
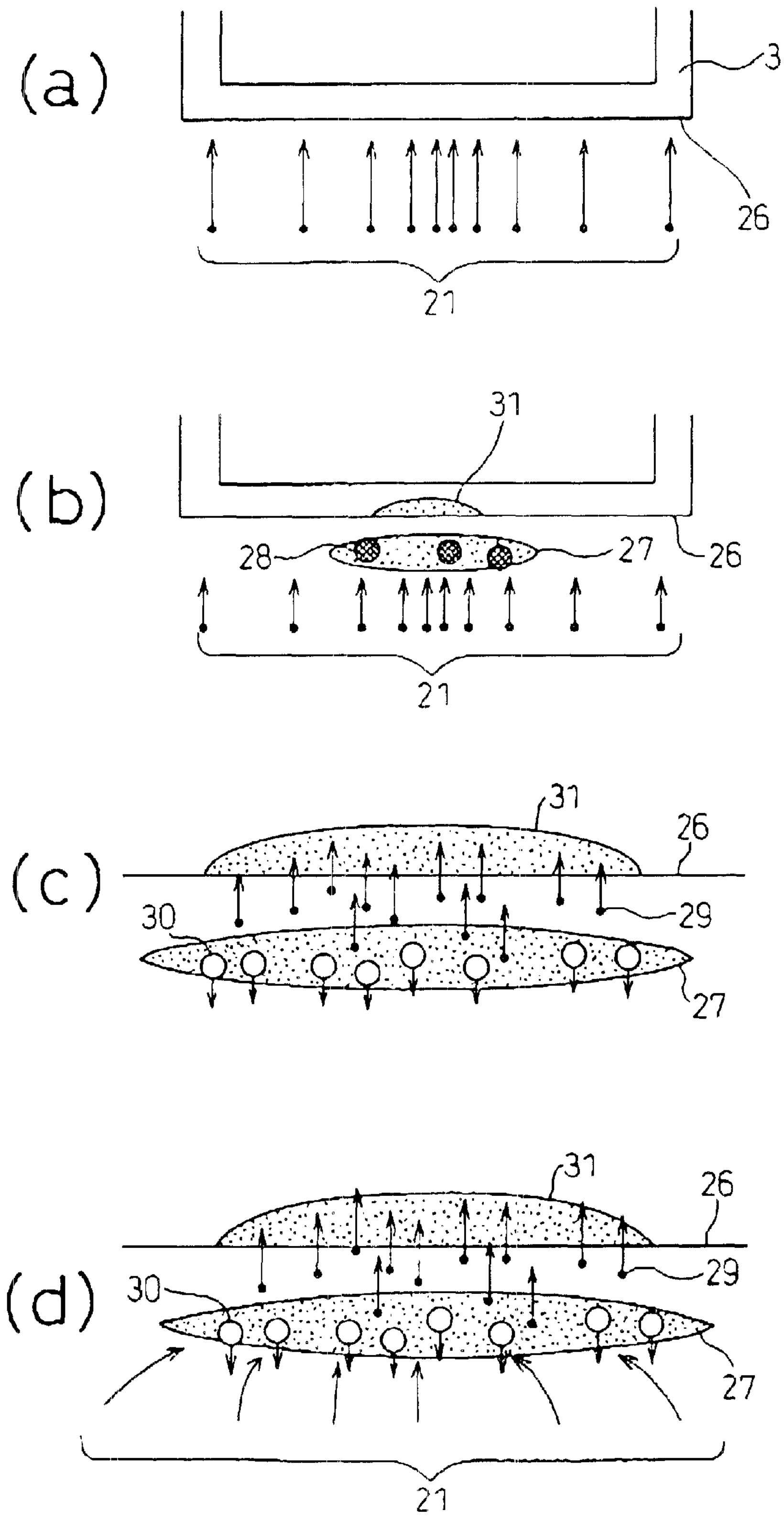
FIG. 5 is views illustrating current concentration on an anode spot.

The life of the transfer mode of plasma heating anode of the present invention is increased by a factor of 1.5 to 2 in comparison with the conventional transfer mode of plasma heating anode shown in FIG. 2.

Figure 27:
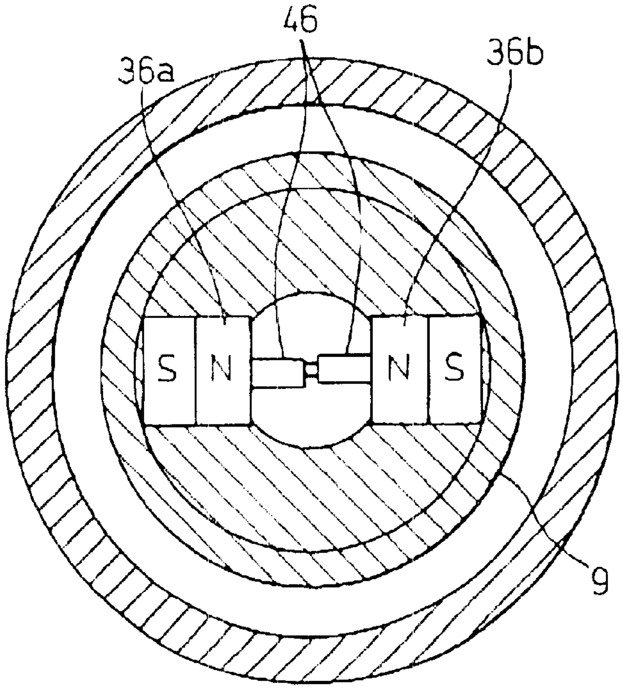
FIG. 27 is a view showing a horizontal cross section of the transferred plasma heating anode shown in FIGS. 13 and 22.

The anode shown in FIGS. 13 and 27 has the features (1) to (4) of the anode shown in FIGS. 12 and 26, and further has the following feature as a fifth feature. In addition, FIG. 13 is a vertical cross-sectional view and FIG. 27 is a horizontal cross-sectional view.

(5b) Two permanent magnets 36 are provided within the partition 9 in the interior of the anode. The two permanent magnets 36*a*, 36*b* are symmetrical with respect to the anode as an axis of symmetry, and are connected with a connecting rod 44. The connecting rod 44 is connected to a rotary axle 45 provided 5 mm vertically above the center of the cooling side at the anode tip end, and the permanent magnets 36*a*, 36*b* can be rotated on the rotary axle 45 in the circumferential direction. The permanent magnets 36*a*, 36*b* can also be rotated in the circumferential direction by a flow 48 of cooling water by providing blades 46 fixed to the connecting rod 44 in a cooling water path 47. A magnetic field 38 (see FIG. 28) formed by the permanent magnets 36*a*, 36*b* near the external surface of the anode tip end is periodically varied with time by the rotating permanent magnets 36*a*, 36*b*. Since the magnetic field and moving charged particles mutually act, the movements of ions and electrons in the plasma are influenced by the variations in the magnetic field 38. As a result, the charged particles suffer disturbance caused by the varying magnetic field, and can move the anode spot even when an anode spot is formed on the external surface of the anode tip end.

The life of the transfer mode of plasma heating anode of the present invention is increased by a factor of 1.5 to 2 in comparison with the conventional transfer mode of plasma heating anode shown in FIG. 2.

EXAMPLE 2

FIGS. 21, 22, 26 and 27 each show a cross-sectional view of one embodiment of the present invention.

Figure 21:
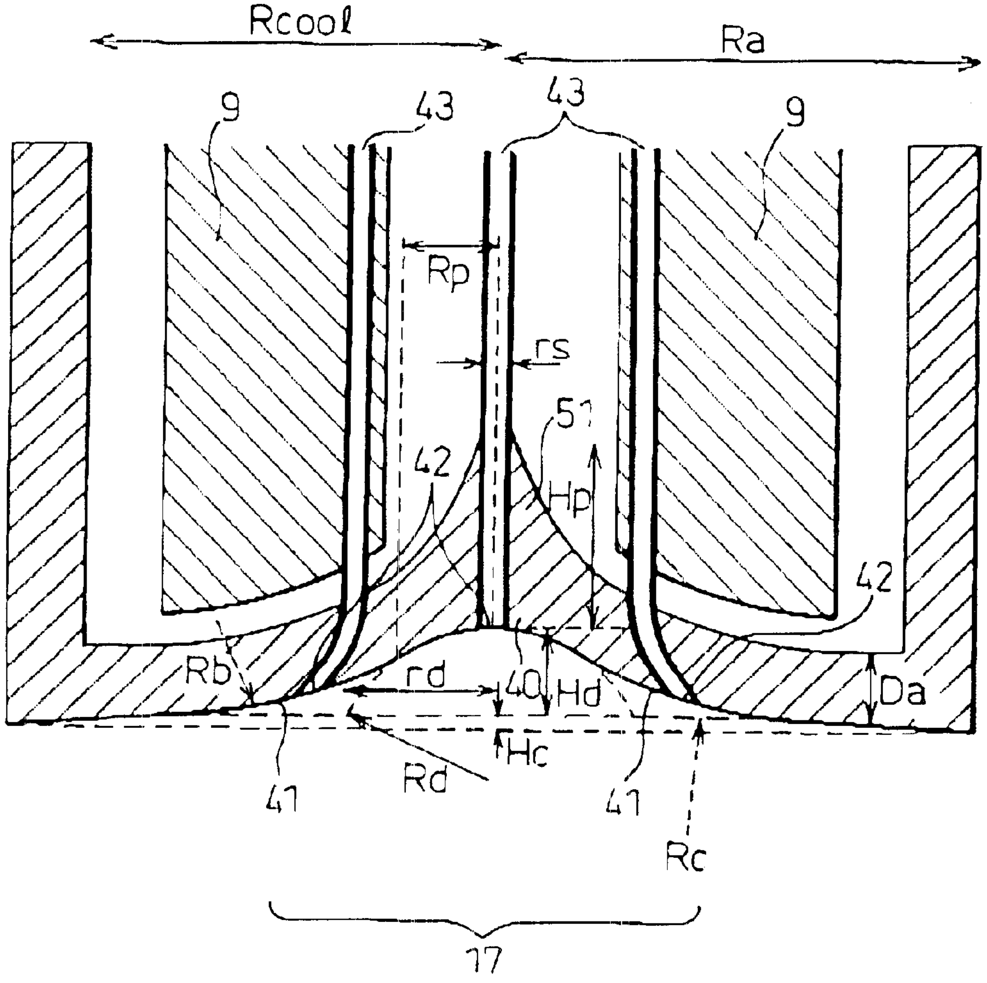
FIG. 21 is a view showing a vertical cross section of another embodiment of a transferred plasma heating anode according to the present invention.

The features of the anode shown in FIGS. 21 and 26 are explained in the following (1) to (6). In addition, FIG. 21 is a vertical cross-sectional view, and FIG. 26 is a horizontal cross-sectional view.

(1) The anode tip end has a radius Ra of the external surface of 25 mm, a radius Rcool on the cooling side of 22 mm and a thickness Da of 3 mm.

(2) A conical projection 51 formed in the center on the cooling side of the anode tip end has a bottom radius Rp of 15 mm and a height Hp of 20 mm. The side face of the conical projection forms is streamlined and matches the flow of cooling water.

Figure 32:
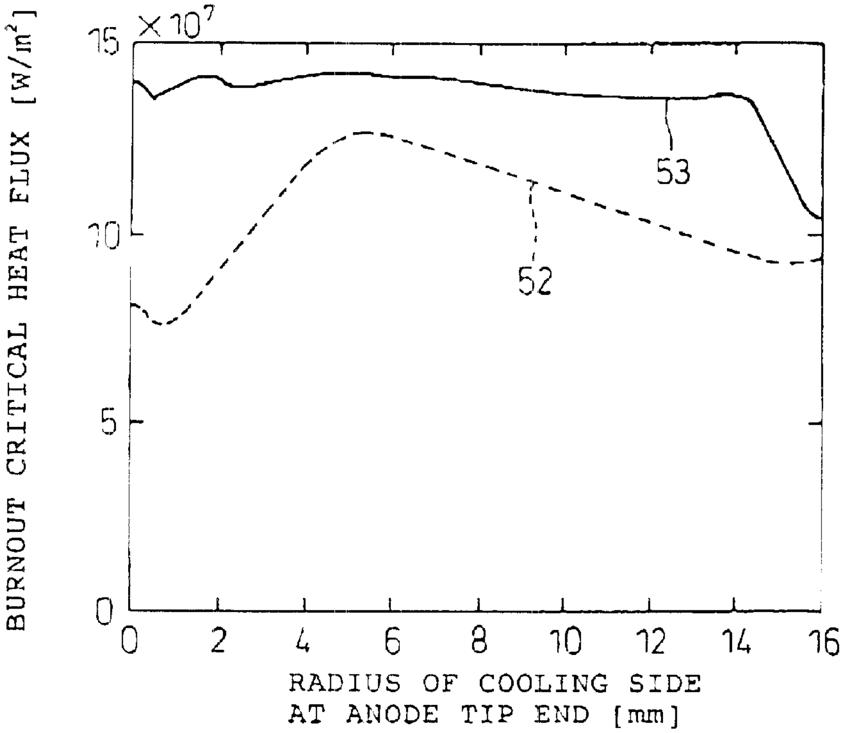
FIG. 32 is a graph showing a curve of the distribution of a burnout critical heat flux on the heat transfer surface of the cooling side at a conventional anode tip end and a curve thereof at an anode tip end of the present invention.

In FIG. 32, a radius on the cooling side of the anode tip end in which the radius Rcool on the cooling side is 22 mm is shown on the abscissa, and a burnout critical heat flux is shown on the ordinate; a change in the heat flux is shown in the figure. In FIG. 32, a dashed line 52 shows a burnout critical heat flux on the heat transfer surface on the tip end cooling side of the conventional anode (see FIG. 2). On the other hand, a solid line 53 in FIG. 32 shows a burnout critical heat flux on the heat transfer surface on the tip end cooling side of the anode in the embodiment of the present invention. It is seen from FIG. 32 that the burnout critical heat flux in the anode of the present embodiment is improved in comparison with the conventional anode and that the burnout critical heat flux is kept constant at a high level in the radial direction of the anode tip end. That is, it is understood that a possibility that burnout is generated is lowered in the anode of the embodiment of the present invention. In addition, a temperature rise in the central portion on the external surface of the tip end can be considered due to an increase in the thickness of the tip end central portion caused by the provision of the projection 51. However, there arises no problem in the embodiment of the present invention because the heat transfer area on the cooling side in the projection 51 is large.

(3) The recess (crown) of the whole of the external surface at the anode tip end has a spherical surface with a curvature Rc of 1,041 mm and has a height Hc of 300 $\mu$m in the center of the anode tip end. The crown structure makes the external surface of the anode tip end approximately planar during plasma heating due to thermal stress deformation.

(4) A spherical recessed portion 40 having a curvature Rd of 15 mm is formed at the area of a radius rd of 10 mm in the central portion 17 of the external surface at the anode tip end. The height Hd of the recessed portion 40 in the center of the anode tip end is 4 mm. The electric field incident on the central portion 17 of the external surface at the anode tip end is dispersed and the current density is lowered in comparison with the conventional type (see FIG. 25) without the recessed portion 40. In addition, a boundary 41 between the recessed portion of the external surface at the anode tip end and its outside must be smoothed to avoid forming a large protruded portion. The curvature Rb of the boundary 41 is desirably at least 40 mm. In Example 1, Rb is determined to be 50 mm.

(5) Since the external surface of the anode tip end is exposed to temperature as high as at least 500° C., the conventional anode, in which oxygen-free copper is used, may suffer creep deformation. In particular, when damage is increased on the external surface of the anode tip end and the tip end thickness is decreased, the amount of creep deformation is increased, and the anode tip end is deformed to have a protruded form. Therefore, a copper alloy containing 0.08% of Cr and 0.15% of Zr is used as the anode material in the same manner as in Example 1 (see FIG. 23).

(6a) Eight supply openings 42*a* to 42*h* that blow an action gas on the external surface of the anode tip end are provided along the circumference on the external surface thereof. Another supply opening 42*i* is provided in the central portion of the external surface thereof. Inner tubes 43*a* to 43*h* which are connected to the supply openings 42*a* to 42*h*, respectively, and through which an action gas is passed are provided within the partition 9. Moreover, an inner tube 43*i* that is connected to the supply opening 42*i* (not shown) is provided on the anode central axis. The inner tubes 43*a* to 43*h* are obliquely provided in the lower portion of the anode so that the action gas is rotated. The action gas blown from the supply openings 42*a* to 42*i* rotates near the external surface thereof to move the anode spot.

The life of the transfer mode of plasma heating anode of the present invention is increased by a factor of 1.5 to 2 in comparison with the conventional transfer mode of plasma heating anode shown in FIG. 2.

The anode shown in FIGS. 22 and 27 has the features (1) to (4) of the anode shown in FIGS. 21 and 26, and further has the following feature as a fifth feature. In addition, FIG. 22 is a vertical cross-sectional view and FIG. 27 is a horizontal cross-sectional view.

(6b) Two permanent magnets 36 are provided within the partition 9 in the interior of the anode. The two permanent magnets 36*a*, 36*b* are symmetrical with respect to the anode as a symmetric axle, and are connected with a connecting rod 44. The connecting rod 44 is connected to a rotary axle 45 provided 5 mm vertically above the center of the cooling side at the anode tip end, and the permanent magnets 36*a*, 36*b* can be rotated on the rotary axle 45 in the circumferential direction. The permanent magnets 36*a*, 36*b* can also be rotated in the circumferential direction by a flow 48 of cooling water by providing blades 46 fixed to the connecting rod 44 in a cooling water path 47. A magnetic field 38 (see FIG. 29) formed by the permanent magnets 36*a*, 36*b* near the external surface of the anode tip end is periodically varied with time by rotating the permanent magnets 36*a*, 36*b*. Since the magnetic field and moving charged particles mutually act, the movements of ions and electrons in the plasma are influenced by the variation of the magnetic field 38. As a result, the charged particles suffer disturbance caused by the varying magnetic field, and can move the anode spot even when the anode spot is formed on the external surface of the anode tip end.

The life of the transfer mode of plasma heating anode of the present invention is increased by a factor of 1.5 to 2 in comparison with the conventional transfer mode of plasma heating anode shown in FIG. 2.

INDUSTRIAL APPLICABILITY

In the present invention, the damage formation speed at an anode tip end in a direct current twin-torch type plasma heating device can be reduced, and the life of the device can be extended. The industrial applicability of the present invention is therefore significant.

What is claimed is:

1. A transferred plasma heating anode for heating a molten metal in a container by applying an Ar plasma generated by passing a direct current through the molten metal, the transferred plasma heating anode comprising;

an anode, composed of a conductive metal, that has an internal cooling structure, a metal protector having an internal cooling structure that is placed outside the anode with a constant gap between the anode and the protector, and a gas supply means that supplies an Ar-containing gas to the gap, is characterized by, the central portion on the external surface of the anode tip end being inwardly recessed, and the boundary between the central portion and the outside of the external surface being smoothly curved.

2. The transferred plasma heating anode according to claim 1, wherein the cooling side of the anode tip end has ribs.

3. The transferred plasma heating anode according to claim 1, wherein the anode has a second gas supply means in the interior of the anode, and the second gas supply means has a function of blowing a gas from the external surface of the anode tip end.

4. The transferred plasma heating anode according to claim 1, wherein the entire and/or central portion of the external surface of the anode tip end is recessed, and the anode has, in the interior of the anode, one or at least two permanent magnets freely rotatable in the circumferential direction.

5. The transferred plasma heating anode according to claim 1, wherein the material of at least the anode tip is a copper alloy containing Cr or Zr.

6. A transferred plasma heating anode for heating a molten metal in a container by applying an Ar plasma generated by passing a direct current through the molten metal, the transferred plasma heating anode comprising;

an anode, composed of a conductive metal, that has an internal cooling structure, a metal protector having an internal cooling structure that is placed outside the anode with a constant gap between the anode and the protector, and a gas supply means that supplies an Ar-containing gas to the gap, is characterized by, the whole of the external surface of the anode tip end being inwardly recessed.

7. The transferred plasma heating anode according to claim 6, wherein the cooling side of the anode tip end has ribs.

8. The transferred plasma heating anode according to claim 6, wherein the anode has a second gas supply means in the interior of the anode, and the second gas supply means has a function of blowing a gas from the external surface of the anode tip end.

9. The transferred plasma heating anode according to claim 6, wherein the entire and/or central portion of the external surface of the anode tip end is recessed, and the anode has, in the interior of the anode, one or at least two permanent magnets freely rotatable in the circumferential direction.

10. The transferred plasma heating anode according to claim 6, wherein the material of at least the anode tip is a copper alloy containing Cr or Zr.

11. A transferred plasma heating anode for heating a molten metal in a container by applying an Ar plasma generated by passing a direct current through the molten metal, the transferred plasma heating anode comprising;

an anode, composed of a conductive metal, that has an internal cooling structure, a metal protector having an internal cooling structure that is placed outside the anode with a constant gap between the anode and the protector, and a gas supply means that supplies an Ar-containing gas to the gap, is characterized by, the cooling surface of the anode tip end having ribs.

12. The transferred plasma heating anode according to claim 11, wherein the anode has a second gas supply means in the interior of the anode, and the second gas supply means has a function of blowing a gas from the external surface of the anode tip end.

13. The transferred plasma heating anode according to claim 11, wherein the entire and/or central portion of the external surface of the anode tip end is recessed, and the anode has, in the interior of the anode, one or at least two permanent magnets freely rotatable in the circumferential direction.

14. The transferred plasma heating anode according to claim 11, wherein the material of at least the anode tip is a copper alloy containing Cr or Zr.

15. A transferred plasma heating anode for heating a molten metal in a container by applying an Ar plasma generated by passing a direct current through the molten metal, the transferred plasma heating anode comprising;

an anode, composed of a conductive metal, that has an internal cooling structure, a metal protector having an internal cooling structure that is placed outside the anode with a constant gap between the anode and the protector, a first gas supply means that supplies an Ar-containing gas to the gap therebetween, and a second gas supply means in the interior of the anode, is characterized by, the second gas supply means having a function of blowing a gas from the external surface of the anode tip end.

16. The transferred plasma heating anode according to claim 15, wherein the entire and/or central portion of the external surface of the anode tip end is recessed, and the anode has, in the interior of the anode, one or at least two permanent magnets freely rotatable in the circumferential direction.

17. The transferred plasma heating anode according to claim 15, wherein the material of at least the anode tip is a copper alloy containing Cr or Zr.

18. The transferred plasma heating anode according to claim 1, wherein the central portion and the whole of the external surface of the anode tip end are inwardly recessed.

19. A transferred plasma heating anode for heating a molten metal in a container by applying an Ar plasma generated by passing a direct current through the molten metal, the transferred plasma heating anode comprising;

an anode, composed of a conductive metal, that has an internal cooling structure, a metal protector having an internal cooling structure that is placed outside the anode with a constant gap between the anode and the protector, and a gas supply means that supplies an Ar-containing gas to the gap, is characterized by, the center on the cooling side of the anode tip having a projection.

20. The transferred plasma heating anode according to claim 19, wherein the central portion of the external surface of the anode tip end is inwardly recessed.

21. The transferred plasma heating anode according to claim 19, wherein the whil of the external surface of the anode tip end is inwardly recessed.

22. The transferred plasma heating anode according to claim 19, wherein the cooling side of the anode tip end has ribs.

23. The transferred plasma heating anode according to claim 19, wherein the anode has a second gas supply means in the interior of the anode, and the second gas supply means has a function of blowing a gas from the external surface of the anode tip end.

24. The transferred plasma heating anode according to claim 19, wherein the entire and/or central portion of the external surface of the anode tip end is recessed, and the anode has, in the interior of the anode, one or at least two permanent magnets freely rotatable in the circumferential direction.

25. The transferred plasma heating anode according to claim 19, wherein the material of at least the anode tip is a copper alloy containing Cr or Zr.

* * * * *